US012570526B2

(12) United States Patent
Dean et al.

(10) Patent No.: US 12,570,526 B2
(45) Date of Patent: Mar. 10, 2026

(54) SYSTEMS, DEVICES AND METHODS FOR INPUT AND OUTPUT PRESSURE MANAGEMENT OF AIR BREATHING ENGINE REFORMERS

(71) Applicant: M2X Energy, Inc., Rockledge, FL (US)

(72) Inventors: John Anthony Dean, Scotia, NY (US); Andrew L. Randolph, Salisbury, NC (US); Joshua B. Browne, New York, NY (US); Douglas C. Hofer, Clifton Park, NY (US)

(73) Assignee: M2X Energy Inc., Rockledge, FL (US)

( * ) Notice: Subject to any disclaimer, the term of this patent is extended or adjusted under 35 U.S.C. 154(b) by 0 days.

(21) Appl. No.: 18/161,058

(22) Filed: Jan. 28, 2023

(65) Prior Publication Data

US 2024/0017993 A1 Jan. 18, 2024

Related U.S. Application Data

(63) Continuation-in-part of application No. 17/746,942, filed on May 17, 2022, now Pat. No. 11,649,201, and
(Continued)

(51) Int. Cl.
*C01B 3/32* (2006.01)
*B01J 8/02* (2006.01)
(Continued)

(52) U.S. Cl.
CPC ............. *C01B 3/326* (2013.01); *B01J 8/0285* (2013.01); *C01B 32/40* (2017.08);
(Continued)

(58) Field of Classification Search
CPC . C01B 3/326; C01B 32/40; C01B 2203/0222; C01B 2203/0261;
(Continued)

(56) References Cited

U.S. PATENT DOCUMENTS

| | | | |
|---|---|---|---|
| 1,107,582 A | 8/1914 | Brownlee |
| 2,362,151 A | 11/1944 | Ostenberg |

(Continued)

FOREIGN PATENT DOCUMENTS

| | | | | |
|---|---|---|---|---|
| CA | 3071428 A1 | * | 4/2019 | ............... C01B 3/36 |
| CN | 103216316 | | 4/2015 | |

(Continued)

OTHER PUBLICATIONS

KR-20080094725-A (Mihailovich et al.)(Oct. 23, 2008) (Machine Translation) (Year: 2008).*

(Continued)

*Primary Examiner* — Hung Q Nguyen

(74) *Attorney, Agent, or Firm* — Glen P. Belvis; Belvis Law, LLC.

(57) ABSTRACT

There are provided systems and methods for using partial oxidation to produce an end product from hydrocarbon gases, such as flare gas. There are provided methods and systems to minimize the amount of compression work needed for an air breathing engine reformer in a gas-to-liquid system and method by one or more of: (a) reducing the amount of nitrogen; (b) increasing back-pressure of the engine reformer from standard 1 or 2 bar, to up to 5 bar; (c) use of a turbo-expander to recover much of the compression work, thus lowering the cost, among other efficiencies, to operate a plant; and (d) utilizing an intensified synthesis loop to achieve acceptable methanol synthesis at lower overall pressure. In an embodiment, the end product is methanol.

54 Claims, 18 Drawing Sheets

Related U.S. Application Data a continuation-in-part of application No. 17/953,056, filed on Sep. 26, 2022, and a continuation-in-part of application No. 17/984,126, filed on Nov. 9, 2022.

(60) Provisional application No. 63/304,463, filed on Jan. 28, 2022, provisional application No. 63/304,471, filed on Jan. 28, 2022, provisional application No. 63/304,475, filed on Jan. 28, 2022, provisional application No. 63/189,756, filed on May 18, 2021, provisional application No. 63/213,129, filed on Jun. 21, 2021, provisional application No. 63/197,898, filed on Jun. 7, 2021, provisional application No. 63/248,519, filed on Sep. 26, 2021, provisional application No. 63/277,522, filed on Nov. 9, 2021.

(51) Int. Cl.
*C01B 3/326* (2026.01)
*C01B 32/40* (2017.01)

(52) U.S. Cl.
CPC .......................... *B01J 2208/00309* (2013.01); *B01J 2208/027* (2013.01); *C01B 2203/0222* (2013.01); *C01B 2203/0261* (2013.01); *C01B 2203/061* (2013.01); *C01B 2203/068* (2013.01)

(58) Field of Classification Search
CPC ........ C01B 2203/061; C01B 2203/068; C01B 2203/04; C01B 2203/0405; C01B 2203/043; C01B 2203/0435; C01B 2203/0485; C01B 2203/0495; C01B 2203/062; C01B 3/36; B01J 8/0285; B01J 2208/00309; B01J 2208/027; C07C 29/151; F02B 2043/103; F02B 19/108; F02B 19/12; F02B 19/18; F02B 43/00; F02B 43/10; F02B 19/10; F02M 23/00; F02M 21/0275; Y02T 10/12
USPC ........................................ 123/253
See application file for complete search history.

(56) References Cited

U.S. PATENT DOCUMENTS

| | | | |
|---|---|---|---|
| 2,543,791 A | 3/1951 | Malin | |
| 2,591,687 A | 4/1952 | Eastman et al. | |
| 2,727,933 A | 12/1955 | Evans | |
| 2,846,297 A | 8/1958 | Herwig | |
| 4,126,668 A | 11/1978 | Erickson | |
| 4,965,052 A | 10/1990 | Lowther | |
| 6,174,460 B1 | 1/2001 | Grunvald | |
| 6,953,010 B1 | 10/2005 | Hofbauer | |
| 7,040,270 B2 | 5/2006 | Herdin | |
| 7,367,183 B2 | 5/2008 | Eberspach | |
| 8,413,617 B2 | 4/2013 | Simpson | |
| 8,677,949 B2 | 3/2014 | Bromberg | |
| 8,793,981 B2 | 8/2014 | Li | |
| 8,857,405 B2 | 10/2014 | Attard | |
| 8,882,863 B2 | 11/2014 | Modroukas | |
| 9,151,212 B2 | 10/2015 | Dumser | |
| 9,169,773 B2 | 10/2015 | Bromberg | |
| 9,316,144 B2 | 4/2016 | Gruber | |
| 9,353,674 B2 | 5/2016 | Bunce | |
| 9,643,906 B2 * | 5/2017 | Zubrin .................... C07C 41/34 | |
| 9,771,919 B2 | 9/2017 | Kim | |
| 9,909,491 B2 | 3/2018 | Bromberg | |
| 10,125,726 B2 | 11/2018 | Henry | |
| 10,161,296 B2 | 12/2018 | Schock | |
| 10,184,374 B2 | 1/2019 | Han | |
| 10,233,808 B2 | 3/2019 | Backhaus | |
| 10,233,871 B2 | 3/2019 | Hill | |
| 10,260,460 B2 | 4/2019 | Singh | |
| 10,465,631 B2 | 11/2019 | Lissianski | |
| 10,513,435 B2 | 12/2019 | Edalati | |
| 10,787,959 B2 | 9/2020 | Roychoudhury | |
| 10,815,123 B2 | 10/2020 | Northrop | |
| 10,815,912 B2 | 10/2020 | Bhosekar | |
| 10,865,709 B2 | 12/2020 | Hwang | |
| 10,907,559 B2 | 2/2021 | Asai | |
| 10,947,934 B2 | 3/2021 | Asai | |
| 11,131,277 B2 | 9/2021 | Asai | |
| 11,649,201 B2 | 5/2023 | Yelvington | |
| 2002/0131907 A1 | 9/2002 | Iwasaki | |
| 2003/0074883 A1 | 4/2003 | Cirrito | |
| 2005/0217178 A1 | 10/2005 | Aoyama | |
| 2009/0182064 A1 | 7/2009 | Griffin | |
| 2010/0175379 A1 | 7/2010 | Liu | |
| 2010/0275891 A1 | 11/2010 | Gruber | |
| 2011/0042620 A1 * | 2/2011 | Singh ...................... C01B 3/382 422/627 |
| 2011/0257276 A1 | 10/2011 | Allam | |
| 2012/0103302 A1 | 5/2012 | Attard | |
| 2013/0160734 A1 | 6/2013 | Redtenbacher | |
| 2013/0220279 A1 | 8/2013 | Cleeves | |
| 2014/0373531 A1 | 12/2014 | Wong | |
| 2015/0126628 A1 | 5/2015 | Patience et al. | |
| 2015/0300296 A1 | 10/2015 | Mulye | |
| 2016/0053668 A1 | 2/2016 | Loetz | |
| 2016/0152537 A1 * | 6/2016 | Zubrin ............... C07C 29/1518 422/162 |
| 2016/0159714 A1 * | 6/2016 | Zubrin ................... B01J 8/0278 422/162 |
| 2017/0284295 A1 * | 10/2017 | Lissianski ................. F02C 3/34 |
| 2020/0369585 A1 | 11/2020 | Castillo-Welter | |
| 2021/0130272 A1 | 5/2021 | Lepri et al. | |
| 2022/0388842 A1 | 12/2022 | Browne | |
| 2022/0401906 A1 | 12/2022 | Dean | |
| 2022/0403272 A1 | 12/2022 | Dean | |
| 2023/0212098 A1 | 7/2023 | Yelvington | |
| 2023/0279802 A1 | 9/2023 | Merical | |
| 2023/0286807 A1 | 9/2023 | Yelvington | |
| 2023/0340919 A1 | 10/2023 | Mercal | |
| 2024/0017235 A1 | 1/2024 | Yelvington | |
| 2024/0017993 A1 | 1/2024 | Dean | |
| 2024/0124377 A1 | 4/2024 | Yelvington | |

FOREIGN PATENT DOCUMENTS

| | | | |
|---|---|---|---|
| EP | 2028350 | 2/2009 | |
| EP | 2606211 | 3/2013 | |
| EP | 2998538 | 3/2016 | |
| EP | 3037646 | 5/2016 | |
| KR | 20080094725 A * | 10/2008 | ............. C01B 3/382 |
| WO | WO-2008077204 A2 * | 7/2008 | ......... B01D 53/8628 |
| WO | WO 2015/138987 | 9/2015 | |
| WO | WO-2017137581 A1 * | 8/2017 | ........... B01J 8/0457 |

OTHER PUBLICATIONS

Nov. 30, 2022, WIPO, PCT/US2022/029707 Search and Opinion.
Nov. 4, 2022, WIPO, PCT/US2022/029708 Search and Opinion.
Apr. 2016, Lim, et al, The Engine Reformer: Syngas Production in an Engine for Compact Gas-to-Liquids Synthesis; vol. 94, p. 623 (Canadian Journal of Chem Eng).
Feb. 2019, Medhat, et al, Frontiers in combustion techniques and burner designs for emissions control and CO2 capture: A review; Int J Energy Res 2019;1-33.
Apr. 2015, Pederstad, et al, Improving utilization of assoicated gas in US tight oil fields (Carbon Limits AS).
(Down loaded) 2022, Nissan, VC-Turbo Engine (https://www.nissan-global.com/EN/INNOVATION/TECHNOLOGY/ARCHIVE/VC_TURBO_ENGINE/).
Apr. 2016, Emmanuel, The Engine Reformer: Syngas Production in an Engine for Compact Gas-to-Liquids Synthesis.
Jun. 23, 2023, Third Party, Third Party submission in U.S. Appl. No. 17/746,927 (claims charts).
Jun. 23, 2023, Third Party, Third Party submission in U.S. Appl. No. 17/746,927 (List of References).

(56)                    References Cited

OTHER PUBLICATIONS

Jun. 2015, Lim, The Engine Reformer: Syngas Production in Engines Using Spark-Ignition and Metallic Foam Catalysts (pp. title-50).

Unknown, Unknown, Third Party submission in U.S. Appl. No. 17/746,927 (pp. 51-75).

Unknown, Unknown, Third Party submission in U.S. Appl. No. 17/746,927 (pp 76-100).

Unknown, Unknown, Third Party submission in U.S. Appl. No. 17/746,927 (pp. 101-130).

Unknown, Unknown, Third Party submission in U.S. Appl. No. 17/746,927 (pp. 131-162).

Oct. 1, 1986, Chao, Thermodynamic Properties of Key Organic Oxygen Compounds in the Carbon Range C, to C, Part 2. Ideal Gas Properties.

1998, Chase, Journal of Physical and Chemical Reference Data Monograph No. 9 NIST-JANAF Thermochemical Tables Fourth Edition Part ,I Al-Co.

Jan. 2021, Methanol Institute, Innovation Outlook Renewable Methanol.

Mar. 2020, IEA, Reducing the environment impact of oil and gas supply is a pivotal element of global energy transitions.

Aug. 11, 2023, WIPO, PCT/US2023/061523 Opinion.

Aug. 11, 2023, WIPO, PCT/US2023/061523 Search.

Jan. 20, 2016, Lim, The Engine Reformer: Syngas Production in an Engine for Compact Gas-to-Liquids Synthesis.

1956, Ing, Production of synthesis gas in the gasoline engine with simultaneous gain in work (Google Translation.

1956, Ing, Herstellung von Synthesegas im Otto-Motor bei g l e ich ze it i g e r A r be i tsg e w i n n u n g.

Jun. 25. 1963, Yamamoto, Production of Synthesis Gas by an Internal Combustion Engine.

1983, Picken, A Method for Estimating Overhaul Life of Internal Operating on Biogas and Methane.

Unknown, Karim, Examination of Rich Mixture Operation of a Dual Fuel Engine.

Unknown, Karim, The Production of Hydrogen by the the Partial Oxidtion of Methane in a Dual Fuel Engine.

2001, Orden, Examination of Rich Mixture Operation of a Dual Fuel Engine.

Oct. 6, 2005, McMillian, Experimental and modeling study of hydrogen/syngas production and particulate emissions from a.

2008, Karim, The production of hydrogen through the uncatalyzed partial oxidation of methane in an internal.

2014, Morsy, Modeling study of the production of hydrogen/syngas via partial oxidation using a homogeneous charge compression ignition engine fueled with natural gas 2016, Lim, The Engine Reformer: Syngas Production in an Engine for Compact Gas-to-Liquids Synthesis.

Mar. 16, 2018, Tartakovsky, Fuel reforming in internal combustion engines.

Jan. 25, 2019, Banke, Power and syngas production from partial oxidation of fuel-rich methane/DME mixtures in an HCCI engine.

Apr. 2, 2019, Voice, Fuel and Engine Effects on Rich-Combustion Products as an Enabler of In-Cylinder Reforming.

Aug. 30, 2020, Atakan, Flexible energy conversion and storage via high-temperature gas-phase reactions: The piston engine as a polygeneration.

Apr. 14, 2020, Wang, Extend Syngas Tield through Increasing Rich Limit by Stratified Air Injection in a Single Cylinder Engine.

2020, Paykani, Synthesis gas as a fuel for internal combustion engines in transporation.

Jul. 14, 2005, Yelvington, On piston engines as hydrocarbon gas reformers for modular, distributed chemical production.

Unknown, Browne, Economic analysis of a non-catalytic, partial-oxidation methane reformer using an internal combustion engine.

Unknown, Idicheria, An Advanced Ignition System for High Efficiency En-gines.

Unknown, Karim (believed to be), Photo copy of book pages (54-72).

2017, L'Heureux, Repurposing mass-produced internal combustion engines Quantifying the value and use of low-cost internal combustion piston engines for modular applications in energy and chemical engineering industries.

2025, Shin, CFD modeling of non-catalytic, partial-oxidation engine reformer for flare mitigation.

Unknown, South West Research Institute (SwRI), Diesel Cylinder Head Design up to 250 Bar Peak Cylinder Pressure.

\* cited by examiner

| Engine Backpressure (Bar) | PR, Stage | PR, Total | Syngas Compressor (kW) | Compressors, Total (kW) | % Change |
|---|---|---|---|---|---|
| 2 | 2.924 | 25.0 | 1231.2 | 1325.6 | – |
| 3 | 2.554 | 16.7 | 961.3 | 1055.7 | -20.4% |
| 4 | 2.321 | 12.5 | 860.3 | 954.6 | -28.0% |

FIG. 5

| Equipment | Shaft Power (kW) |
|---|---|
| Inlet Air Compressor | 92.4 |
| Syngas Compressor | 961.3 |
| Recycle Compressor | 2.0 |
| Total compressor power, gross | 1055.7 |
| Turbo-expander | −292.5 |
| Total compressor power, net | 763.2 |

FIG. 9

Global Warming Potential (GWP) Values Relative to CO$_2$

| Industrial Designation or Common Name | Chemical Formula | GWP Values for 100-Year Time Horzon | | |
| --- | --- | --- | --- | --- |
| | | Second Assessment Report (SAR) | Fourth Assessment Report (AR4) | Fifth Assessment Report (AR5) |
| Carbon Dioxide | CO$_2$ | 1 | 1 | 1 |
| Methane | CH$_4$ | 21 | 25 | 28 |
| Nitrous Oxide | N$_2$O | 310 | 298 | 265 |

FIG. 12

SYSTEMS, DEVICES AND METHODS FOR INPUT AND OUTPUT PRESSURE MANAGEMENT OF AIR BREATHING ENGINE REFORMERS

This application: (i) claims under 35 U.S.C. § 119(e)(1) the benefit of the filing date of, and claims the benefit of priority to, U.S. provisional application Ser. No. 63/304,463, filed Jan. 28, 2022; (ii) is a continuation in part of U.S. application Ser. No. 17/746,942, filed May 17, 2022, which claims under 35 U.S.C. § 119(e)(1) the benefit of the filing date of, and claims the benefit of priority to, U.S. provisional application Ser. No. 63/189,756 filed May 18, 2021, 63/213, 129 filed Jun. 21, 2021, and 63/197,898 filed Jun. 7, 2021; (iii) is a continuation in part of U.S. application Ser. No. 17/953,056, filed Sep. 26, 2022, which claims under 35 U.S.C. § 119(e)(1) the benefit of the filing date of, and claims the benefit of priority to, U.S. provisional application Ser. No. 63/248,519, filed Sep. 26, 2021; (iv) is a continuation in part of U.S. application Ser. No. 17/984,126, filed Nov. 9, 2022, which claims under 35 U.S.C. § 119(e)(1) the benefit of the filing date of, and claims the benefit of priority to, U.S. provisional application Ser. No. 63/277,522 filed Nov. 9, 2021; (v) claims under 35 U.S.C. § 119(e)(1) the benefit of the filing date of, and claims the benefit of priority to, U.S. provisional application Ser. No. 63/304,471, filed Jan. 28, 2022; and, (vi) claims under 35 U.S.C. § 119(e)(1) the benefit of the filing date of, and claims the benefit of priority to, U.S. provisional application Ser. No. 63/304,475, filed Jan. 28, 2022, the entire disclosure of each of which is incorporated herein by reference.

BACKGROUND OF THE INVENTION

Field of the Invention

The present inventions relate to new and improved methods, devices and systems for reducing compressor work (e.g., compression requirements, such as number and size of compressors and the energy needed to operate the compressors) required for reformer-based hydrocarbon processing systems, such as gas-to-liquid systems, including systems for recovering and converting hydrocarbon gases, such as flare gas, into useful and economically viable materials.

In particular, the present inventions relate to new and improved methods, devices and systems for operating engines, in particular air-breathing reformers, for use in gas-to-liquids systems and processes.

The term "flare gas", "waste gas" and similar such terms should be given their broadest possible meaning, and would include gas generated, created, associated or produced by or from oil and gas production, hydrocarbon wells (including conventional and unconventional wells), petrochemical processing, refining, landfills, wastewater treatment, dairies, livestock production, and other municipal, chemical and industrial processes. Thus, for example, flare gas and waste gas would include stranded gas, associated gas, landfill gas, vented gas, biogas, digester gas, small-pocket gas, and remote gas.

Typically, the composition of flare gas is a mixture of different gases. The composition can depend upon the source of the flare gas. For instance, gases released during oil and gas production mainly contain natural gas. Natural gas is more than 90% methane ($CH_4$) with ethane and smaller amounts of other hydrocarbons, water, $N_2$ and $CO_2$ may also be present. Flare gas from refineries and other chemical or manufacturing operations typically can be a mixture of hydrocarbons and in some cases $H_2$. Landfill gas, biogas or digester gas typically can be a mixture of $CH_4$ and $CO_2$, as well as small amounts of other inert gases. In general, flare gas can contain one or more of the following gases: methane, ethane, propane, n-butane, isobutane, n-pentane, isopentane, n-hexane, ethylene, propylene, 1-butene, carbon monoxide, carbon dioxide, hydrogen sulfide, hydrogen, oxygen, nitrogen, and water.

The majority of flare gas is produced from smaller, individual point sources, such as a number of oil or gas wells in an oil field, a landfill, or a chemical plant. Prior to the present inventions, flare gas, and in particular flare gas generated from hydrocarbon producing wells and other smaller point sources, was burned to destroy it, and in some instances may have been vented directly into the atmosphere. This flare gas could not be economically recovered and used. The burning or venting of flare gas, both from hydrocarbon production and other endeavors, raises serious concerns about pollution and the production greenhouse gases.

As used herein unless specified otherwise, the terms "syngas" and "synthesis gas" and similar such terms should be given their broadest possible meaning and would include gases having as their primary components a mixture of $H_2$ and CO; and may also contain $CO_2$, $N_2$, and water, as well as, small amounts of other materials.

As used herein unless specified otherwise, the term "product gas" and similar such terms should be given their broadest possible meaning and would include gases having $H_2$, CO and other hydrocarbons, and typically significant amounts of other hydrocarbons, such as methane.

As used herein unless specified otherwise, the term "reprocessed gas" includes "syngas", "synthesis gas" and "product gas".

As used herein unless specified otherwise, the terms "partial oxidation", "partially oxidizing" and similar such terms mean a chemical reaction where a sub-stoichiometric mixture of fuel and air (i.e., fuel-rich mixture) is partially reacted (e.g., combusted) to produce a syngas. The term partial oxidation includes both thermal partial oxidation (TPDX), which typically occurs in a non-catalytic reformer, and catalytic partial oxidation (CPDX). The general formula for a partial oxidation reaction is $$C_nH_m + \frac{n}{2}O_2 \rightarrow nCO + \frac{m}{2}H_2$$

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

Generally, the term "about" as used herein unless stated otherwise is meant to encompass the larger of a variance or range of ±10%, or the experimental or instrument error associated with obtaining the stated value.

As used herein unless specified otherwise, the term "$CO_2e$" is used to define carbon dioxide equivalence of other, more potent greenhouse gases, to carbon dioxide (e.g., methane and nitrous oxide) on a global warming potential basis of 20 or 100 years, based on Intergovernmental Panel on Climate Change (IPCC) Fifth Assessment Report (AR5) methodology. The term "carbon intensity" is taken to mean the lifecycle $CO_2e$ generated per unit mass of a product.

As used herein, unless specified otherwise, the term "crude methanol" is defined as methanol produced in a methanol synthesis loop prior to the removal of water, dissolved gases, or other contaminants. Crude methanol often contains 5-20 wt % water, dissolved gases (e.g., 1-2 wt % $CO_2$) and trace contaminants (e.g., ethanol). As used herein, unless specified otherwise, the term "stabilized methanol" is defined as crude methanol that has passed through a flash operation (e.g., a single-stage flash drum) to reduce the concentration of dissolved gases and other light components. Often stabilized methanol will have <1% $CO_2$ and most typically about 0.5 wt % $CO_2$. As used herein, the terms "source methanol", "initial methanol", or similar terms refer to "crude methanol", "stabilized methanol" or both. As used herein, the term "grade methanol" is defined as methanol that meets a purity standard such as the ASTM AA standard (D1152) or IMPCA methanol reference specifications.

As used herein, unless specified otherwise, the terms % and mol % are used interchangeably and refer to the moles of a first component as a percentage of the moles of the total, e.g., formulation, mixture, material or product.

As used herein, unless specified otherwise the terms weight % (abbreviated wt %) and mass % refer to the weight of a first component as a percentage of the weight of the total, e.g., formulation, mixture, material or product.

As used herein, unless stated otherwise, room temperature is 25° C., and standard temperature and pressure is 15° C. and 1 atmosphere (1.01325 bar). Unless expressly stated otherwise all tests, test results, physical properties, and values that are temperature dependent, pressure dependent, or both, are provided at standard temperature and pressure.

As used herein, unless stated otherwise, the terms "fuel-to-air equivalence ratio", "equivalence ratio", "fuel/air equivalence ratio", "(1)" or "ER", and similar such terms have the same meaning and are to be given their broadest meaning and would include the ratio of the actual fuel/air ratio to the stoichiometric fuel/air ratio. The stoichiometric air/fuel ratio is that needed for ideal, stoichiometric combustion to occur, which is when all the fuel and oxygen is consumed in the reaction, and the products are carbon dioxide and water.

Global Warming and Environmental Concerns

The relative harm to the environment by the release of waste gases when compared to $CO_2$, an established highly problematic gas, are shown FIG. 12.

The environmental impact in terms of global warming potential of methane slippage from flare gas and venting cannot be overstated. According to a 2019 International Energy Agency (IEA) report, about 200 billion cubic meter (bcm) of waste or flare gas were combusted or vented into the atmosphere in 2018. About 50 bcm of gas were vented, and about 150 bcm were combusted in flares. Combustion is intended to convert hydrocarbons to $CO_2$, but their peak efficiency is 98%, and that efficiency drops in the presence of wind. The combination of inefficient combustion and venting results in total $CO_2e$ emissions of about 1.4 gigatons of $CO_2e$, which amounts to about 2.7% of all anthropogenic sources of $CO_2e$ per year.

This Background of the Invention section is intended to introduce various aspects of the art, which may be associated with embodiments of the present inventions. Thus, the forgoing discussion in this section provides a framework for better understanding the present inventions, and is not to be viewed as an admission of prior art.

SUMMARY

There has been a long-standing, expanding and unmet need for systems, devices and methods to convert otherwise uneconomic hydrocarbon-based fuel (e.g., stranded, associated, non-associated, landfill, flared, small-pocket, remote gas, wastewater treatment) to value-added, easily transported products (such as methanol, ethanol, ammonia, dimethyl-ether, F-T liquids, and other fuels or chemicals). There has been a continuing need for improved systems and methods to control engine operation, in particular, the inlet and outlet pressures and pressure differentials, when air-breathing engines and operations are used as reformers, as well as, when these engines are operated under rich condic-tiones, in such systems, devices and methods to convert otherwise uneconomical hydrocarbon-based fuel into value-added, easily transported products. The present inventions, among other things, solve these needs by providing the articles of manufacture, devices and processes taught, and disclosed herein.

There are generally significant problems, costs and inefficiencies associated with the compression work that are used in some embodiments of gas-to-liquid systems, because the pressure required at the synthesis step is typically much higher than the pressure at the exit of the engine reformer. For example, for methanol synthesis the desired pressure for the inlet to the methanol production unit is typically bar, while the pressure at the exit a commercial engine is typically near 1 bar (the exit or output from the engine is used to feed, e.g., is the intermediate for the methanol synthesis unit). Thus, prior to the present inventions, this 50-fold difference would typically have to be made up through compression work, e.g., compressors. Embodiments of the present inventions, among other things, solve these problems and needs by providing the articles of manufacture, devices and processes taught, and disclosed herein.

Thus, there is provided methods and systems that minimize the amount of compression work needed for a gas-to-liquid system and method utilizing an air breathing engine reformer, having or using one or more of: (a) reducing the amount of nitrogen; (b) increasing back-pressure of the engine from standard 1 or 2 bar, to up to 5 bar; (c) use a turbo-expander to recover much of the compression work, thus lowering the cost, among other efficiencies, to operate a plant; and (d) utilize an intensified synthesis loop to achieve acceptable methanol synthesis at lower overall pressure.

Additionally, there is provided a gas-to-liquid system and method having an engine reformer producing a syngas intermediate at pressure of about 2 bar to about 5 bar as a means of reducing the downstream compression requirements; a syngas compressor that compresses the syngas to a desired downstream synthesis pressure to provide a high-pressure syngas; and, a downstream synthesis process that converts the high-pressure syngas into desired products.

Further, there is provided a gas-to-liquid system and method having a downstream synthesis reactor that selectively removes the product or byproduct of the synthesis reaction from unreacted synthesis gas (syngas) to shift the equilibrium to achieve high single-pass conversion at lower synthesis pressures; wherein the product separation occurring either in situ in the synthesis reactor, in a close-coupled fashion, or both; whereby there is a reduction or elimination of a recycle loop to the synthesis reactor, leading to reduced compression work for recompression of the recycled gases; and, a means of separation of the products from the reactants in the reactor, which may include one or more of adsorption, absorption, membrane separation, and distillation, or the like.

Further, there is provided a gas-to-liquid system and method having a turbo-expander downstream of the recuperator for recovering energy from the gaseous product stream as it is depressurized prior to discharge from the system; whereby the recovered energy is used to reduce the net compression work for process and thereby enabling self-sustaining operation.

Still further, there is provided these methods, systems and devices having one or more of the following features: modifications to the engine reformer, such as changes to the inlet charge boosting or valve timing, to promote good volumetric efficiency and net brake power of the engine; various syngas conditioning steps to remove soot, sulfur, oxygen, carbonyls, and other contaminants; a means of regenerating a sorbent or sweep stream to recover the product and return the sorbent/sweep material to the reactor; using outputs from the engine-reformer to provide heat, electricity, shaft power, or pneumatic/hydraulic pressure to the downstream reactive separation process; a recuperative heat exchanger to shuttle heat from the hot syngas stream to the turbo-expander inlet stream to increase the enthalpy and turbo-exchanger work produced; an indirect heat transfer loop for the recuperative heat exchange that decouples the process streams; thermal storage in the indirect heat-transfer loop to improve heat utilization, ease process start-up and suppress feedback from any process disturbance; and, an integrated turbo-expander that includes interstage heat exchangers in a multistage compressor-expander.

Thus, there is provided a method of converting a gas to an end product, the method including: receiving a flow of a hydrocarbon-based fuel source, where the composition is primarily gaseous hydrocarbons and inert gases from a source; partially oxidizing the fuel source in an air-breathing reciprocating engine to produce a syngas mixture with a $H_2/CO$ ratio suitable for synthesis of liquids; and, performing a step for reducing compressor work.

Yet further there is provided these methods and systems having one or more of the following features: wherein the step for reducing compressor work includes reducing an amount of nitrogen; wherein the step for reducing compressor work includes increasing a back-pressure of the air-breathing reciprocating engine; wherein the back-pressure is increased up to 5 bar; wherein the back-pressure is greater than 2 bar; wherein the step for reducing compressor work includes using a turbo-expander heat exchanger system; wherein the step for reducing compressor work includes a reactive separation synthesis. wherein the air-breathing reciprocating engine is a rich-burn engine; wherein the air-breathing reciprocating engine is a variable compression ratio engine; wherein the air-breathing reciprocating engine is a compression ignition engine; and, wherein the air-breathing reciprocating engine is a spark ignition engine.

Additionally, there is provided a system for converting a gas to an end product, the system having: an inflow port for receiving a flow of a hydrocarbon-based fuel source, where the composition is primarily gaseous hydrocarbons and inert gases from a source; the inflow port in fluid communication with an air-breathing reciprocating engine, whereby the engine is configured to partially oxidizing the fuel source to produce a syngas mixture with a $H_2/CO$ ratio suitable for synthesis of liquids; and, a means for reducing compressor work.

Moreover, there is provided these methods and systems having one or more of the following features: wherein the means for reducing compressor work includes a means to reduce the amount of nitrogen; wherein the means to reduce the amount of nitrogen includes an oxygen enrichment unit;

wherein the means to reduce the amount of nitrogen includes a nitrogen rejection unit; wherein the means for reducing compressor work includes an increased back-pressure of the air-breathing reciprocating engine; wherein the increased back-pressure is up to 5 bar; wherein the increased back-pressure is greater than 2 bar; wherein the means for reducing compressor work includes using a turbo-expander-compressor-heat exchanger system; wherein the turbo-expander-compressor-heat exchanger system includes a 3 stages; wherein the turbo-expander-compressor-heat exchanger system includes a compressor turbine assembly; wherein the turbo-expander-compressor-heat exchanger system includes 2 stages and each stage having a compressor, a turbine and a heat exchanger; wherein the turbo-expander-compressor-heat exchanger system includes 3 stages and each stage having a compressor, a turbine and a heat exchanger; wherein the means for reducing compressor work includes a reactive separation synthesis loop; wherein the air-breathing reciprocating engine is a rich-burn engine; wherein the air-breathing reciprocating engine is a variable compression ratio engine; wherein the air-breathing reciprocating engine is a compression ignition engine; wherein the air-breathing reciprocating engine is a spark ignition engine; wherein the fuel source is a flare gas; wherein the engine is a compression ignition engine including a diesel cycle engine, or homogeneous charge compression ignition engine; wherein the engine is a spark ignition engine including an otto cycle; wherein the engine is an opposed-piston free-piston linear internal combustion engine; wherein the engine is a crankshaft-driven opposed-piston internal combustion engine with a crankshaft phaser to rotate the phasing of one piston relative to the other thereby modifying overall compression ratio.

Furthermore, there is provided a system for converting a flare gas into methanol with reducing compressor work, the system having: a first line for receiving a flow of air, and a second line for receiving a flow of a flare gas; the first and second lines in fluid communication with an air breathing engine reformer assembly; a turbo-expander assembly in fluid communication with a third line; the engine reformer assembly in fluid communication with the third line; wherein the third line connects the engine reform assembly and the turbo-expander assembly, whereby an intermediate product from the engine reformer can flow to the turbo expander assembly; the turbo-expander assembly in fluid communications with a fourth line, a fifth line and a sixth line; a methanol synthesis assembly in fluid communication with the fourth line, the fifth line and the sixth line; wherein the fourth line connects the turbo-expander to the methanol synthesis assembly and is configured to provide a first flow from the turbo-expander to the methanol synthesis assembly; wherein the fifth line connects the turbo-expander to the methanol synthesis assembly and is configured to provide a second flow from the turbo-expander assembly to the methanol synthesis assembly; and wherein the sixth line connects the turbo-expander to the methanol synthesis assembly and is configured to provide a third flow from the methanol synthesis assembly to the turbo-expander assembly.

Moreover, there is provided these methods and systems having one or more of the following features: wherein the intermediate product is a synthesis gas; wherein the first flow from the turbo-expander to the methanol synthesis assembly is a synthesis gas; wherein the engine is a conventional spark-ignited reciprocating engine that achieves variable 'effective' compression ratio utilizing camshaft phasers to rotate the intake and exhaust camshafts to affect valve opening and closing; wherein the engine is a conventional spark-ignited reciprocating engine that achieves variable 'effective' compression ratio utilizing a variable lift and/or duration valvetrain to affect valve opening and closing; wherein the engine has a multi-link system in place of a traditional connecting rod to rotate the crankshaft, and an actuator motor changes the multi-link system endpoint; wherein the engine is a 2-stroke engine; wherein the engine is a 4-stroke engine; wherein the engine speed is varied together with engine compression ratio to achieve desired combustion burn and desired exhaust gas composition; wherein the inlet manifold air temperature is varied together with engine compression ratio to achieve desired combustion burn and desired exhaust gas composition; wherein the inlet manifold air pressure (e.g., boost level) is varied together with engine compression ratio to achieve desired combustion burn and desired exhaust gas composition; and wherein steam or hydrogen is added to the incoming air or fuel and the amount of addition is varied together with engine compression ratio to achieve desired combustion burn and desired exhaust gas composition.

Still further, there is provided these methods and systems having one or more of the following features: where the engine is operated under an ER of at least 1.5; where the engine is operated under an ER of at least about 2; where the engine is operated under an ER of at least about 2.5; where the engine is operated under an ER of at least about 3; where the engine is operated under an ER of from about at least about 2.5; wherein a compression ratio is controlled between a ratio of 8:1 to 14:1; wherein downstream of the engine is a combination of integrated heat exchangers, compression system components, and heat exchangers to prepare the syngas for the downstream synthesis reactors; wherein downstream of the engine there is a downstream synthesis reactor system to produce useful liquid products; wherein a cloud-based remote monitoring system, including AI-trained anomaly detection, to dynamically monitor variable-valve timing changes to assess and respond to fuel supply anomalies; wherein from a $CO_2e$ life-cycle-assessment perspective, results in negative $CO_2e$ emissions of about 40 kg $CO_2e$ per kg of end product (in this case, liquid methanol), compared to baseline liquid methanol production from pipeline natural gas, when produced from flare gas; wherein the resulting negative $CO_2e$ emissions are about 70 kg $CO_2e$ per kg of end product (methanol) when produced from flare gas and displacing an equivalent kg of baseline methanol from pipeline natural gas; wherein the resulting negative $CO_2e$ emissions are about 130 kg $CO_2e$ per kg of end product (methanol) when produced from flare gas and displacing an equivalent kg of baseline methanol from coal gasification; wherein the end product includes methanol; wherein the end product includes a material selected for the group consisting of ethanol, ammonia, dimethyl-ether, and F-T liquids; wherein the fuel source is a flare gas from a hydrocarbon well; wherein the fuel source is flare gas from an oil well; wherein the fuel source is a flare gas from an unconventional oil well; wherein the fuel source is a flare gas is selected from the group consisting of petrochemical processing, refining, landfills, wastewater treatment, and livestock; wherein the flow of fuel gas is at a rate of about scfd to about 30,000,000 scfd; wherein the flow of the fuel gas is at a rate of about 500,000 scfd to about 20,000,000 scfd; wherein the flow of the fuel gas is at a rate of about 600,000 scfd to about 15,000,000 scfd; and, wherein the flow of the fuel gas is at a rate of about 700,000 scfd to about 10,000,000 scfd,

BRIEF DESCRIPTION OF THE DRAWINGS

FIG. 1 is a chart showing the equilibrium constants for methanol synthesis reactions for use in accordance with the present inventions, where K1 is the equilibrium constant for CO hydrogenation reaction (R1) in units of $atm^{-2}$, K2 is the equilibrium constant for $CO_2$ hydrogenation reaction (R2) in units of $atm^{-2}$ and K3 is the equilibrium constant for the reverse water-gas shift reaction (R3), which is unitless.

Figure 2:
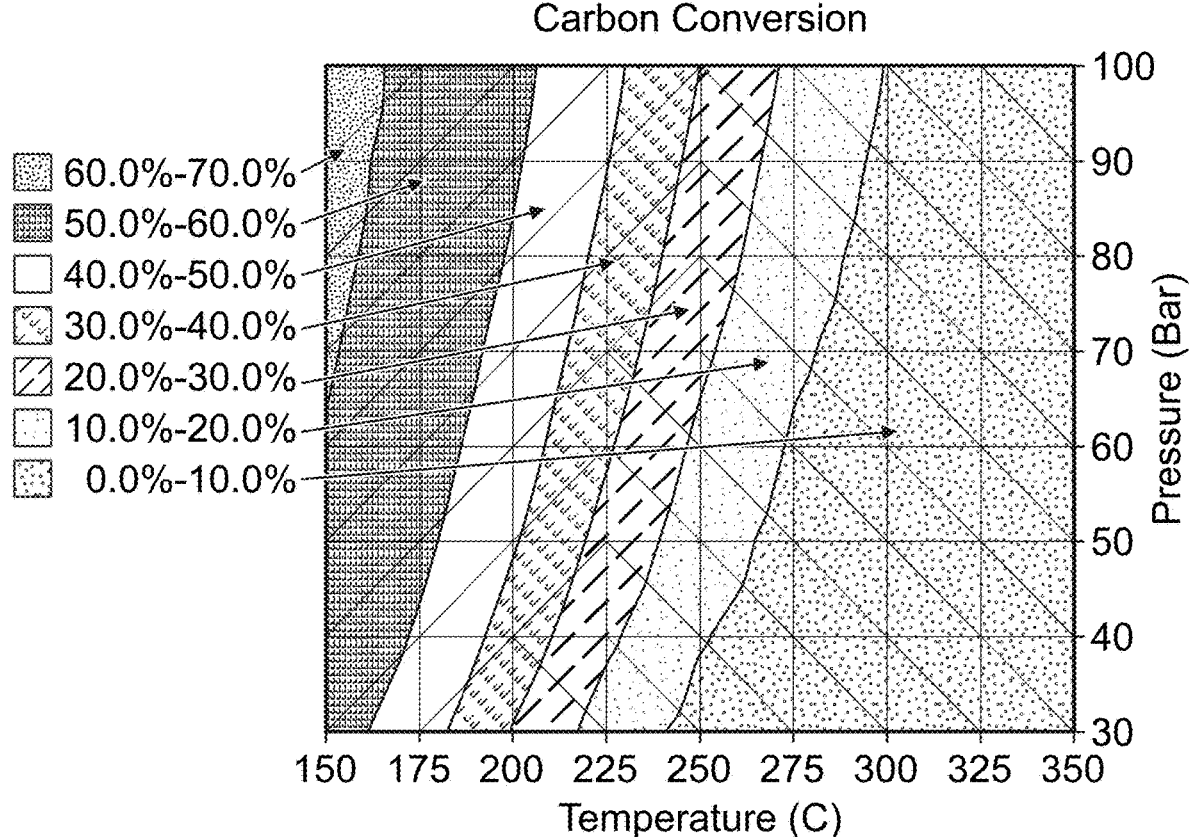

FIG. 2 is a chart showing a surface plot of equilibrium-limited carbon ($CO+CO_2$) conversion to methanol as a function of reactor temperature and pressure, in accordance with the present inventions. The percentages on left of the chart indicate the carbon conversion for each region of the chart area corresponding to a particular temperature and pressure.

Figure 3:
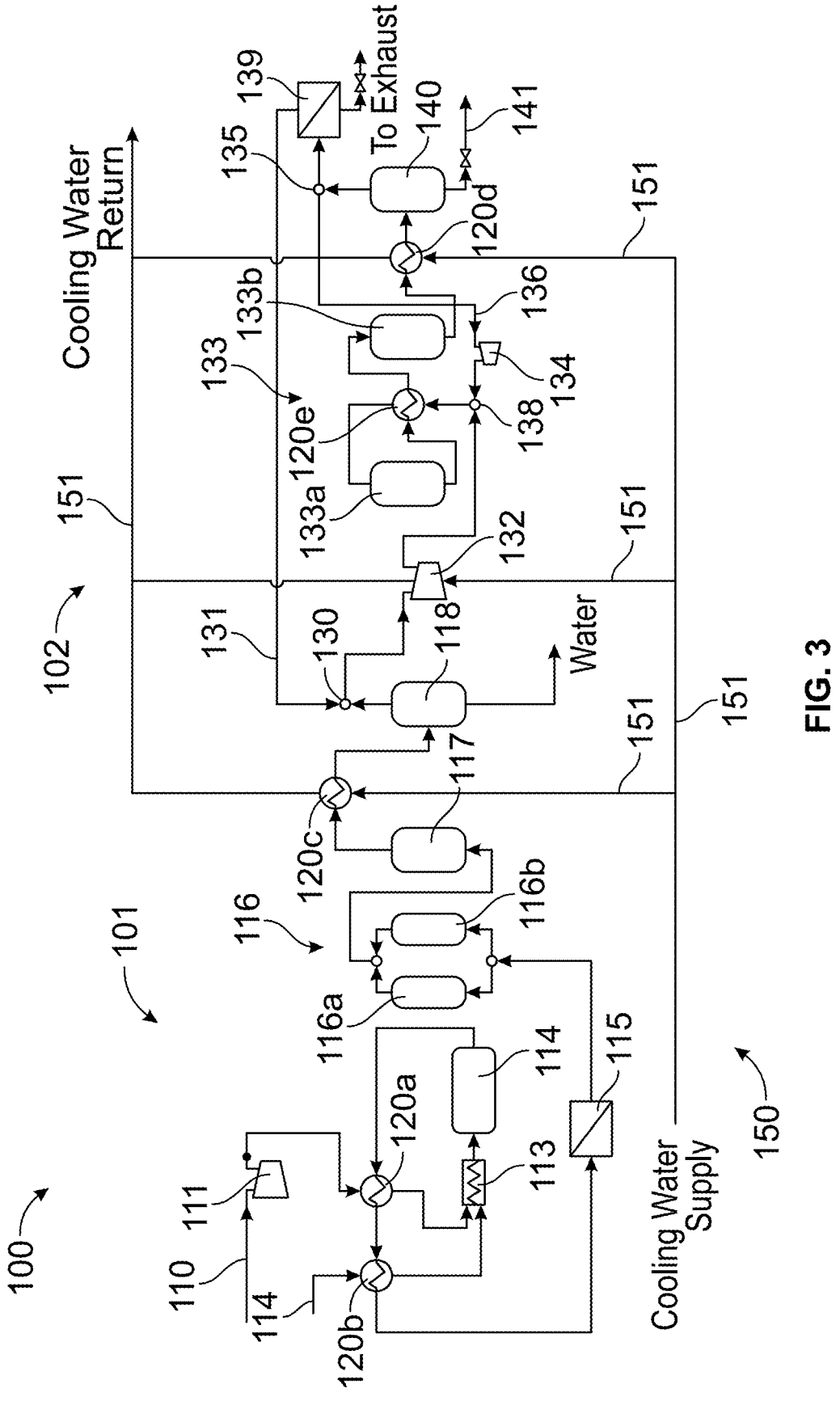

FIG. 3 is a schematic flow diagram of an embodiment of a system and process in accordance with the present inventions.

Figure 4:
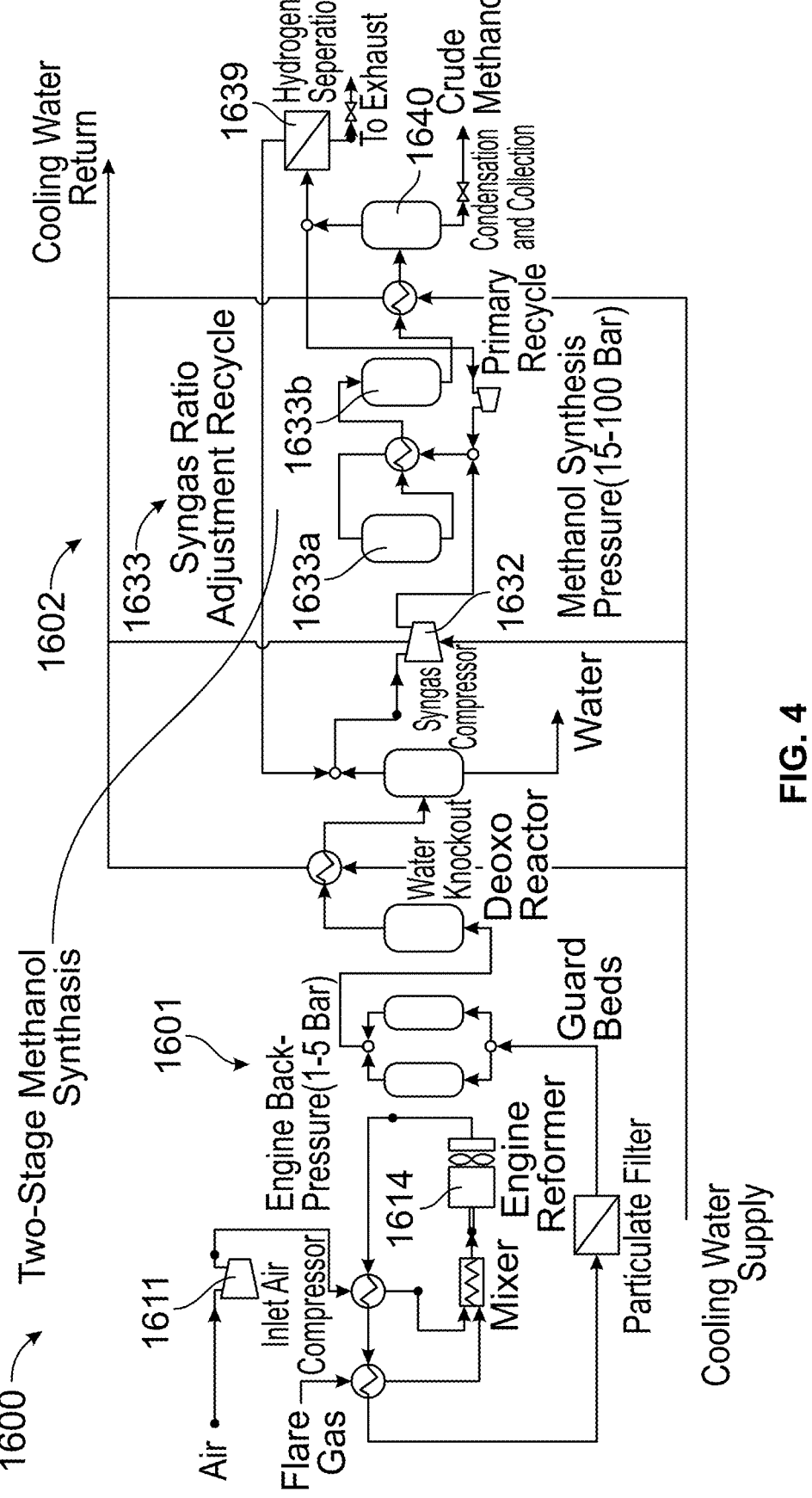

FIG. 4 is a schematic flow diagram of an embodiment of a system and process in accordance with the present inventions, highlighting differences in methanol synthesis pressure.

FIG. 5 is a table showing compressor power as a function of engine backpressure to achieve 50 bar downstream synthesis pressure for use in accordance with the present inventions.

Figure 6:
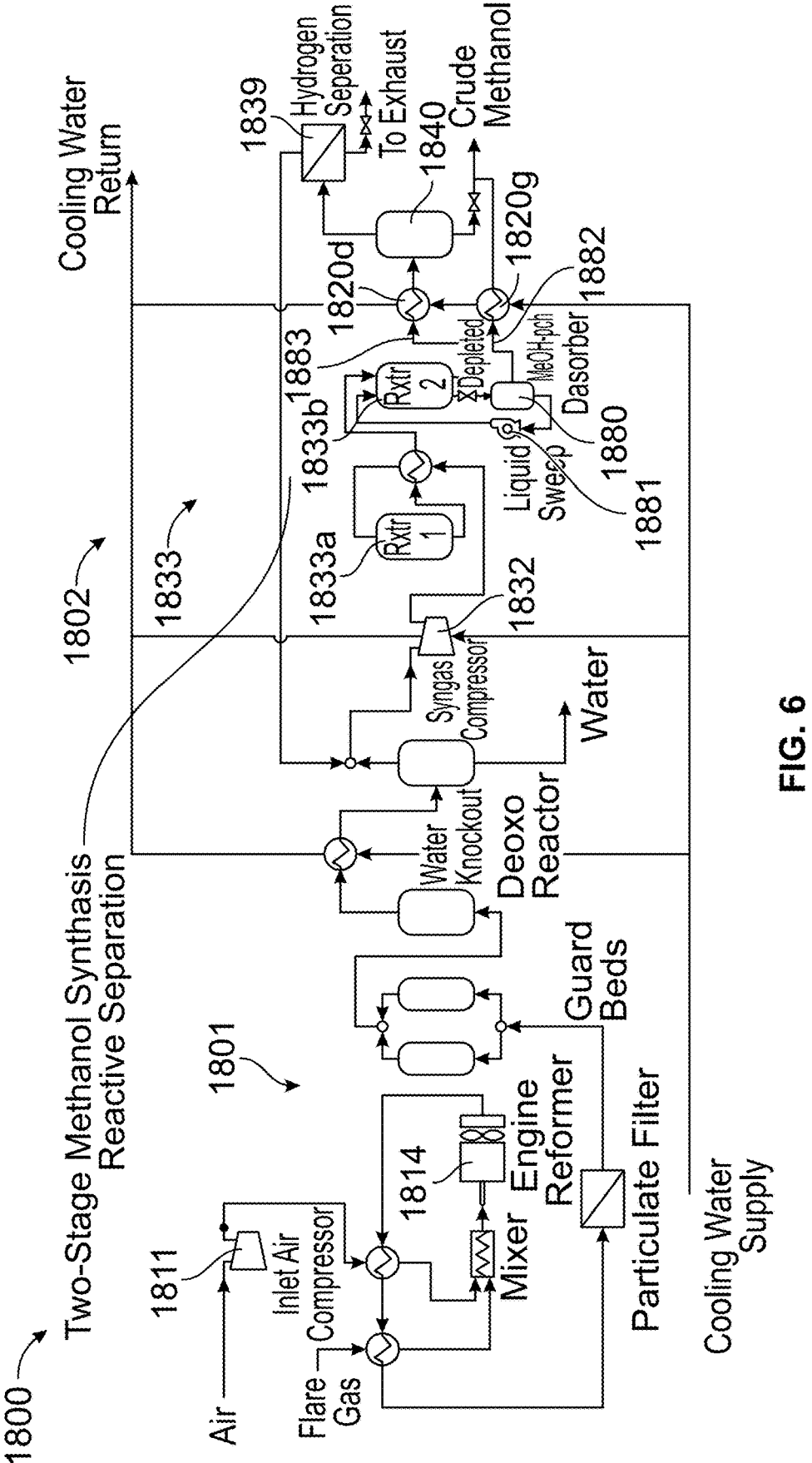
Figure 7:
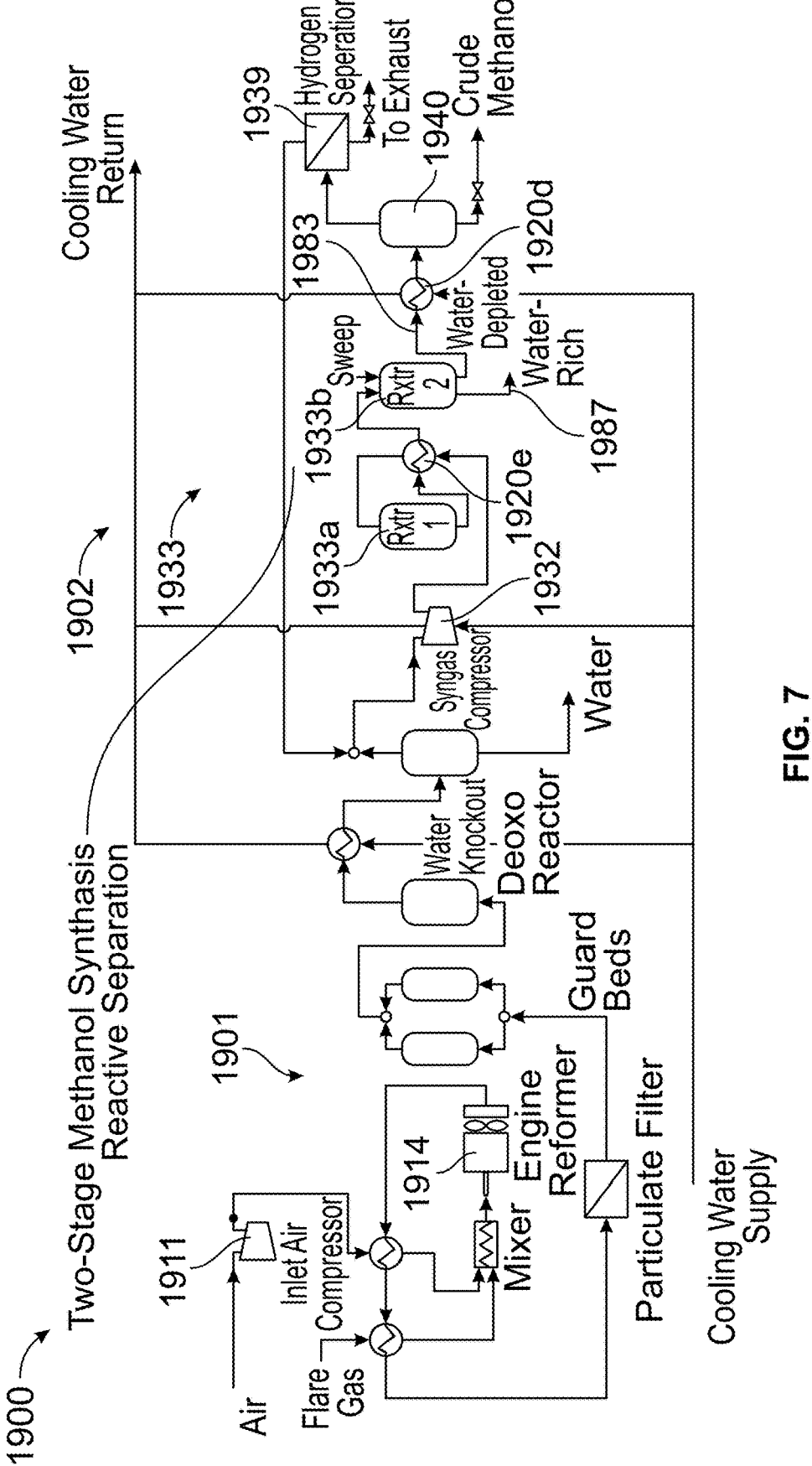

FIG. 6 is a schematic flow diagram of an embodiment of a system and process having reactive product separation in accordance with the present inventions, FIG. 7 is a schematic flow diagram of an embodiment of a system and process having reactive byproduct separation in accordance with the present inventions.

Figure 8:
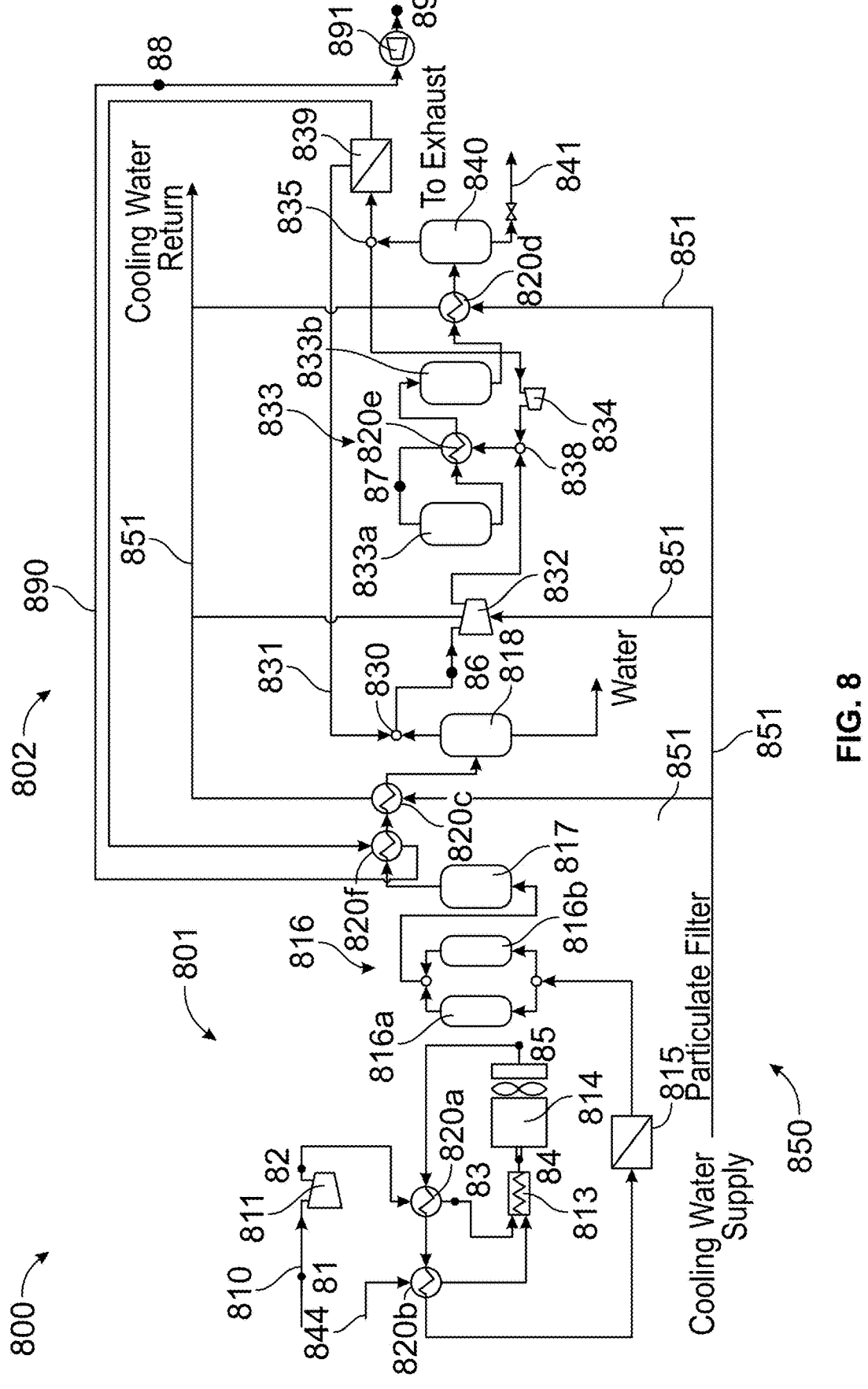

FIG. 8 is a schematic flow diagram of an embodiment of a system and process having a recuperator and turbo-expander in accordance with the present inventions.

FIG. 9 is a table showing compressor power (gross and net) for gas-to-methanol process using turbo expander (3 bar engine backpressure, 50 bar methanol synthesis pressure) in accordance with the present inventions.

Figure 10:
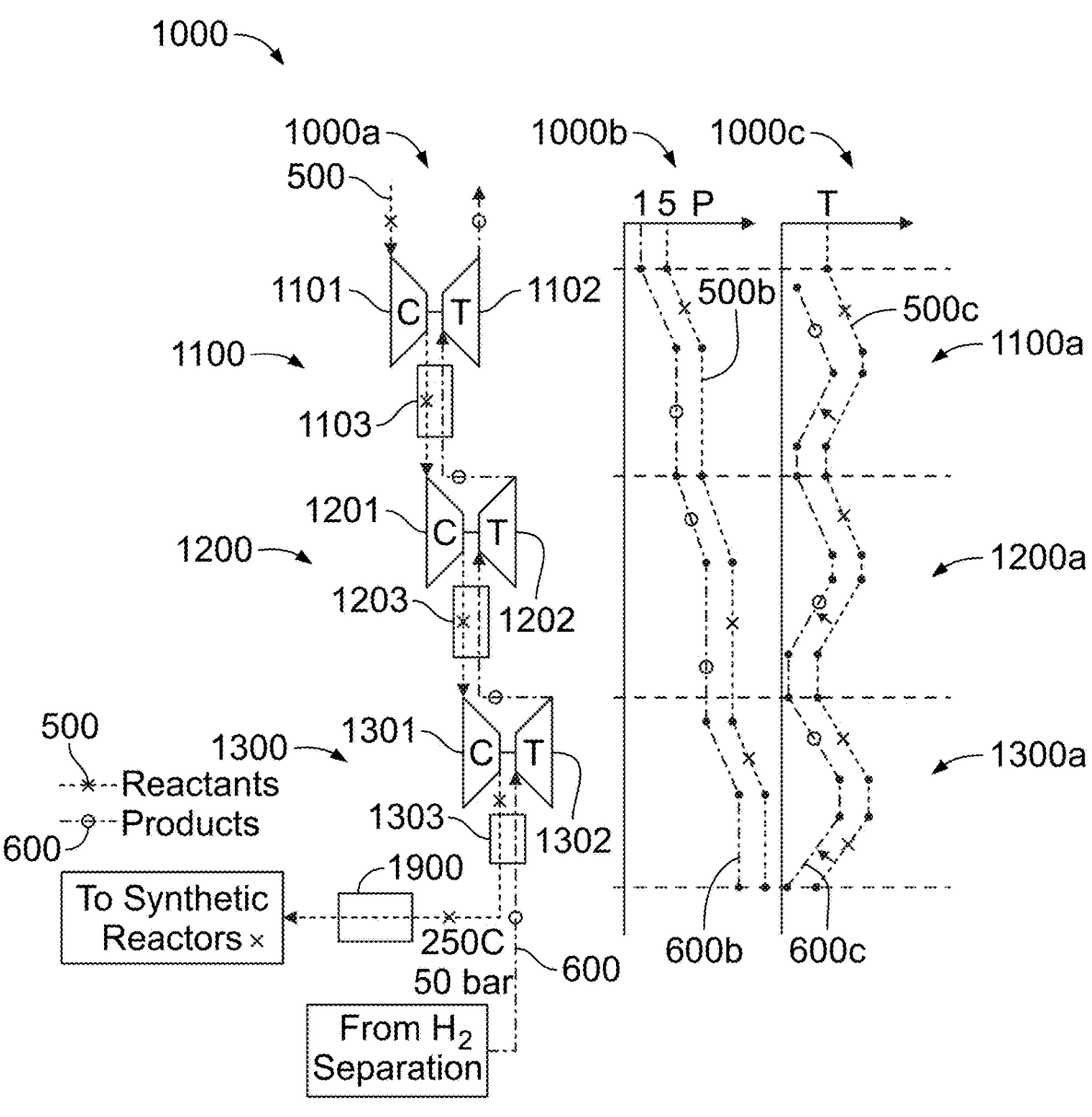

FIG. 10 is a schematic flow diagram of an embodiment of a system and process showing an embodiment of an integrated turbo-expander system and method (including temperature and pressure operating profiles) for use in embodiments of gas-to-methanol systems in accordance with the present inventions.

Figure 11:
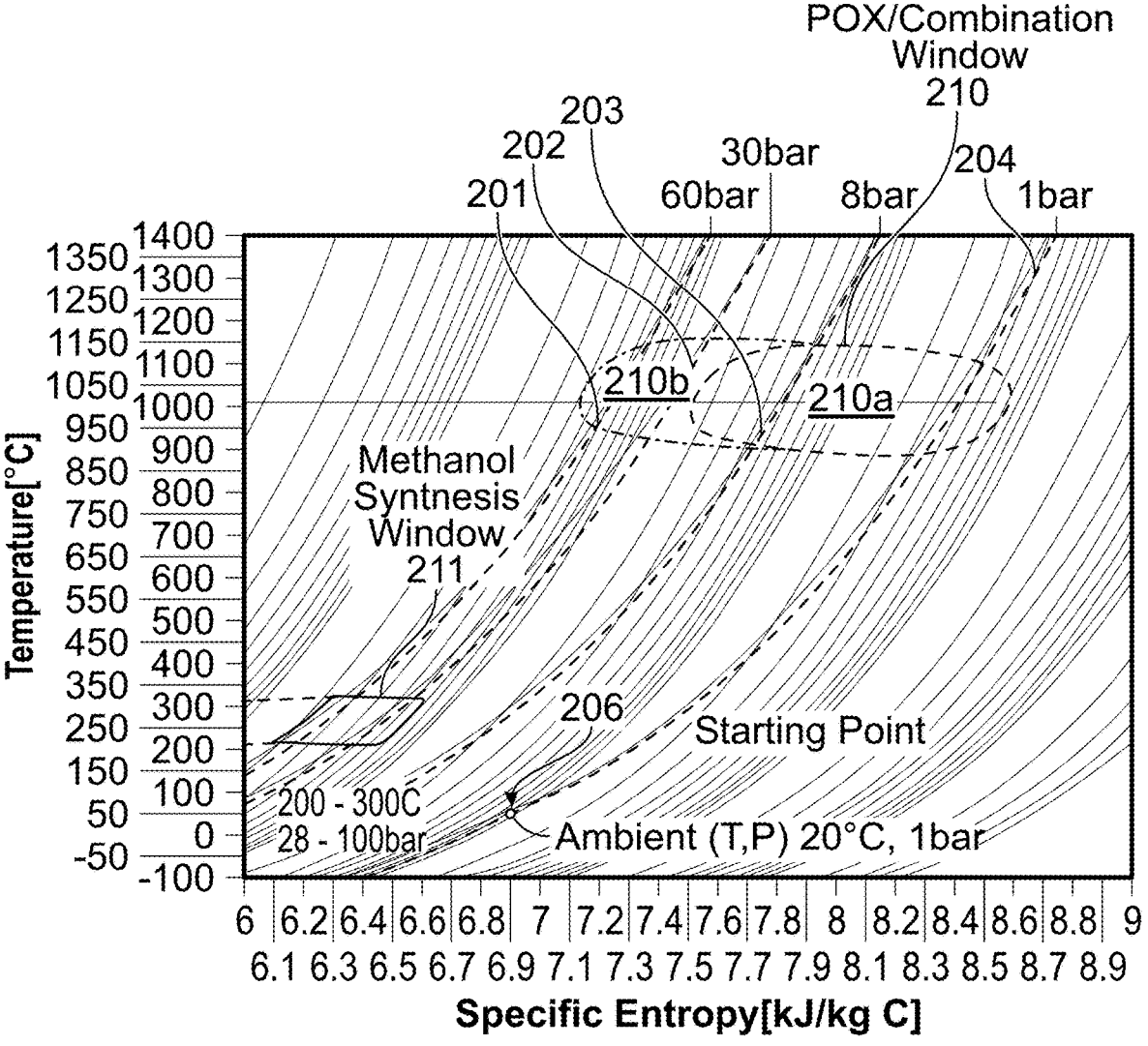

FIG. 11 is a T-S diagram of embodiments of the thermodynamic state points for converting waste, e.g., flare gas to syngas to value added products using an embodiment of an air-breathing process in accordance with the present inventions.

FIG. 12 is a table showing global warming potential values.

Figure 13:
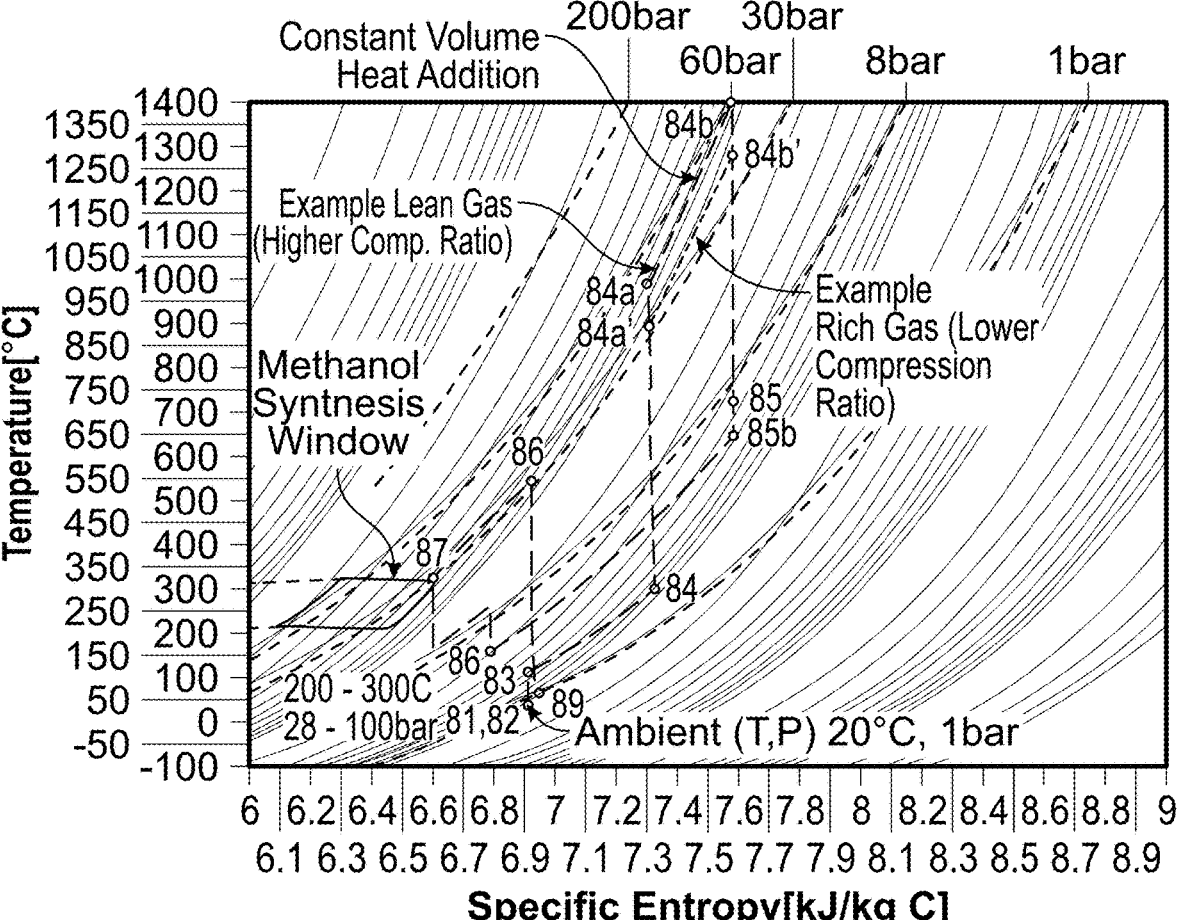

FIG. 13 is a T-S diagram showing an embodiment of a process, operating conditions and thermodynamic state points for converting flag gas to syngas to methanol, using the system of FIG. 8 having a spark ignition reciprocating engine in accordance with the present inventions.

Figure 14:
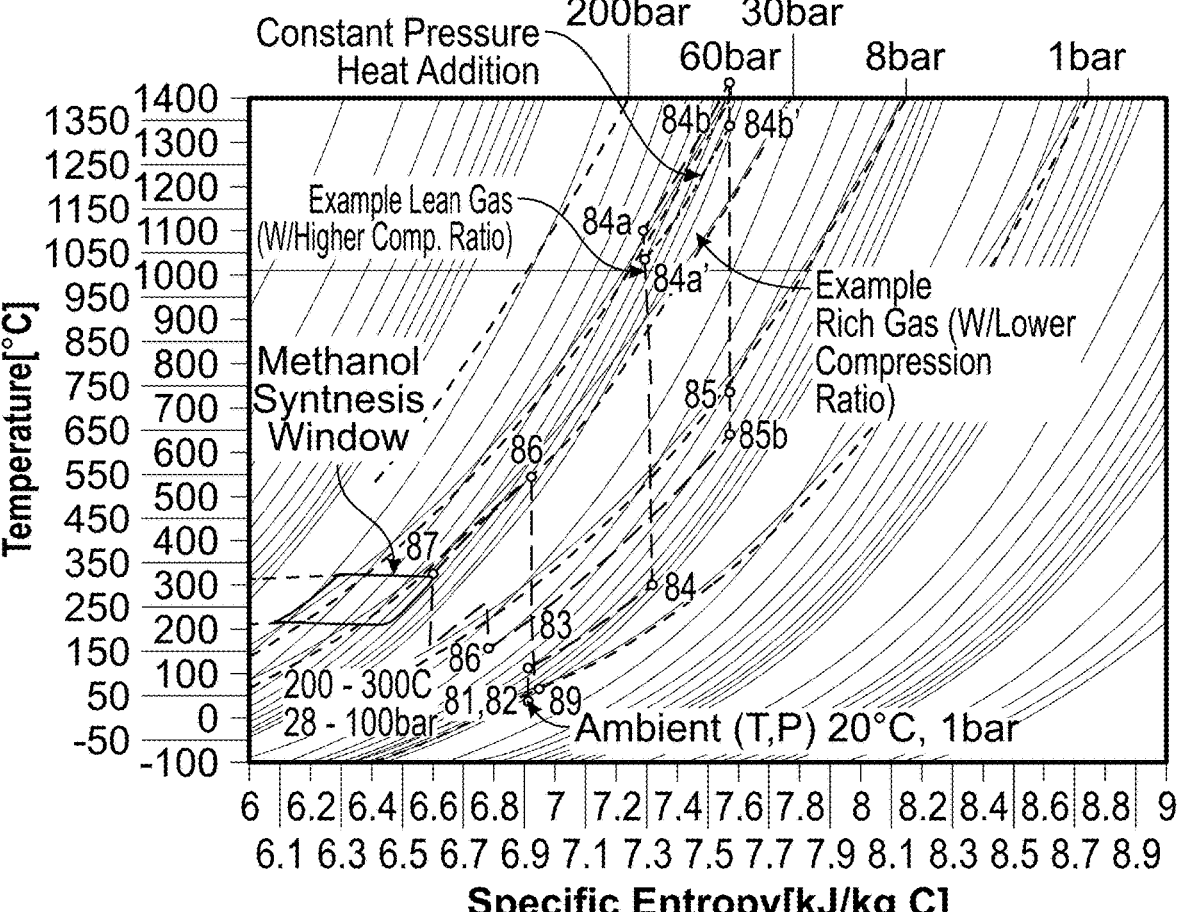

FIG. 14 is a T-S diagram showing an embodiment of a process, operating conditions and thermodynamic state points for converting flag gas to syngas to methanol, using the system of FIG. 8 having a compression ignition reciprocating engine in accordance with the present inventions.

FIGS. 15 and 15A to 15C are schematic flow diagrams of an embodiment of a system and process having a flow-matched turbo-expander and compressor in accordance with the present inventions.

DESCRIPTION OF THE PREFERRED EMBODIMENTS

The present inventions generally relate to systems, devices and methods to recover in an economical fashion usable fuels from hydrocarbon gases, and in particular, in an embodiment, to achieve such recovery at smaller, isolated or remote locations or point sources for flare gas.

In general, embodiments of the present inventions include devices and system to reduce compressor work (e.g., compression requirements, such as number and size of compressors and the energy needed to operate the compressors) required for reformer-based hydrocarbon processing systems, such as gas-to-liquid systems.

In general, embodiments of the present inventions include devices and systems to reduce compressor work required for reciprocating engine reformer-based hydrocarbon processing systems, such as gas-to-liquid systems.

In general, embodiments of the present inventions relate to systems and methods having gas-to-liquids systems and processes, e.g., for processing flare gas to methanol. In these systems an air-breathing engine reformer produces a syngas intermediate that is further converted to methanol in a downstream synthesis step. Examples of these gas-to-liquid systems are taught and disclosed in US patent publication no. 2022/0388930 and in U.S. patent application Ser. No. 17/953,056 (filed Sep. 26, 2022) and Ser. No. 17/984,126 (filed Nov. 9, 2022), the entire disclosure of each of which is incorporated herein by reference. In particular, embodiments of the present inventions relate to devices, systems and methods to improve and enhance the pressure differential associated with the air-breathing engine reformer in these gas-to-liquids systems and processes, and thus reduce compressor work need for operation of these systems. Thus, embodiments of the present devices and system to reduce compressor work required for reciprocating engine reformer-based hydrocarbon processing systems are utilized with, or as a part of, these gas-to-liquid systems.

Figure 1:
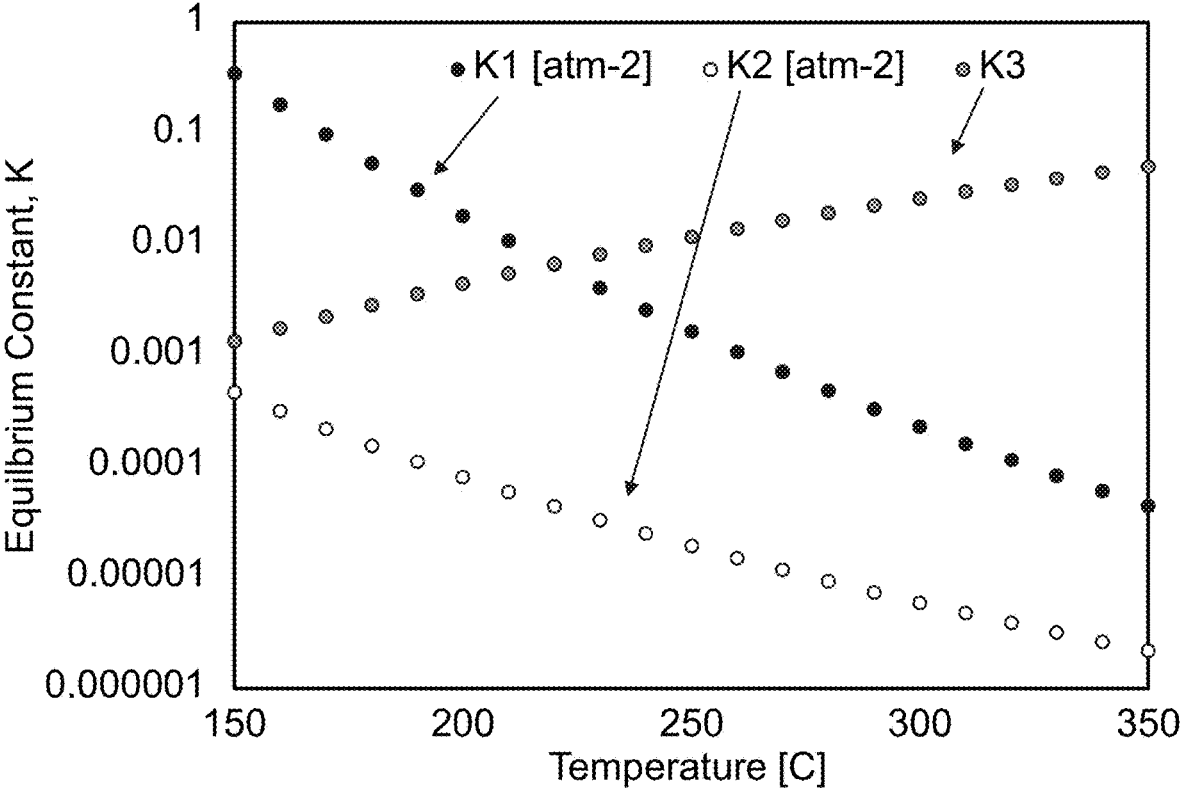

Turning to FIG. 1 there is shown equilibrium constants for the typical three reactions in methanol synthesis. Note that any two of these reactions are linearly independent (e.g., R1 and R2) and the third (e.g., R3) is a combination of the other two. Achieving the ideal syngas stoichiometry presents a direct path to methanol generation in a downstream synthesis step per Reactions (1)-(3):

$$CO+2H_2 \leftrightarrow CH_3OH \quad \Delta Hr=-90.7 \text{ kJ/mol (CO hydrogenation)} \quad (R1)$$

$$CO_2+3H_4 \leftrightarrow CH_3OH+H2O \quad \Delta Hr=-49.5 \text{ kJ/mol (CO}_2 \text{ hydrogenation)} \quad (R2)$$

$$CO_2+H_2 \leftrightarrow CO+H_2O \quad \Delta Hr=41.2 \text{ kJ/mol (reverse water-gas shift)} \quad (R3)$$

The hydrogenation reactions producing methanol from CO and $CO_2$ (R1 and R2) are exothermic and the RWGS reaction (R3) is endothermic. As such, the overall equilibrium-reaction to methanol favors low temperatures. However, because the catalytic activity (and associated reaction rates) decreases with temperature, there is a practical minimum to the reactor temperature.

Turning to FIG. 2 there is shown a predicted single-pass carbon ($CO+CO_2$) conversion at equilibrium as a function of reactor temperature and pressure. High conversion favors lower temperatures and higher pressures. These results were generated using measured equilibrium data for R1-R3 at the ideal syngas stoichiometry (S=2) from an air-breathing reformer. FIGS. 1 and 2 highlight the fundamental chemical and physical limitations, and that have previously led to relatively high synthesis pressures and associated compression work for the commercial methanol synthesis process, which embodiments of the present inventions address and improve upon by reducing compressor work.

Further, turning to FIG. 5 there is shown the predicted compressor work (total and for syngas compression only), as a function of the engine exhaust backpressure for a 50 bar downstream synthesis pressure. These data are generated using a chemical process simulation that performed the mass and energy balances for the embodiment of a gas-to-liquid system and method of the type shown for example in FIG. 4. The syngas compressor is treated as a three-stage compressor with interstage cooling. The isentropic efficiency of the compressor is assumed to be 75%, representative of industrial centrifugal and reciprocating compressors. The syngas ratio adjustment recycle stream enters the compressor at the inlet to the second stage. Increasing the engine exhaust backpressure from 2 bar up to 3 bar decreases the compression work by 20.4%. Further increasing the backpressure from 2 bar to 4 bar decreases the compression work by 28.0%. Thus, a diminishing return and therefore optimal value of engine exhaust backpressure for the embodiment of FIG. 4 would be in the 2-5 bar range to balance reduction in compression work with reduction in engine reformer breathing and performance.

Now turning to FIG. 9 there is shown the compression power (gross and net) for a gas-to-methanol process embodiment using a turbo-expander assuming a 3-bar engine backpressure and 50-bar methanol synthesis pressure. These data are generated using a chemical process simulation that performed the mass and energy balances for an embodiment of a gas-to-liquid system and method of the type shown for example in FIG. 8. The gross compressor work, which comprises the syngas compressor, primary recycle compressor, and inlet air compressor, is dominated by the syngas compressor. The gross compressor power is 1055.7 kW, which is typically too high for self-sustaining operation without energy recovery. The turbo-expander recovers 292.5 kW of power reducing the net compressor power demand to 763.2 kW, which is preferable using the brake power produced by the engine reformer in a self-sustaining operational scenario.

The advantages of the present methods, devices and systems include among other things: 1) lower capital expense ("capex") and operating expense ("opex") compared to conventional technology; 2) better suitability for remote, distributed applications that benefit from process self-sustainability with regard to power; and improvement on conventional, commercial methanol synthesis technology that enables small, distributed, self-sufficient applications using stranded gas.

Although this specification focusses on methanol synthesis as an example, it is understood that the present methods and systems have applicability to other similar downstream synthesis processes. Thus, and in general, embodiments of the present methods and system find application in, and can be used with or in conjunction with, systems and methods for the convert otherwise uneconomic hydrocarbon-based fuel (e.g., stranded, associated, landfill, flared, small-pocket, remote gas) to value-added, easily transported products (such as methanol, ethanol, ammonia, dimethyl-ether, F-T liquids, and other fuels or chemicals) using an autonomous, modular system.

In an embodiment of the present inventions, systems and methods reduce the gas compression requirements for synthesis of methanol (or other downstream product such as ammonia or F-T liquids) in an integrated system with an engine-based reformer for small, modular, distributed conversion of stranded gas to products, preferably value-added, easily transported products (such as methanol, ethanol, ammonia, dimethyl-ether, F-T liquids, and other fuels or chemicals). The gas compression requirements contribute to the overall capx and opex of the process and impact the overall profitability of the modular plant. Compressors for increasing the pressure of the syngas exiting the engine reformer to values for downstream methanol synthesis can account for nearly half of the overall plant capex. Additionally, for deployed applications, it is preferred that the plant be self-sufficient with little or no external power requirements. Power requirements are dominated by power required to drive the compressors and therefore compressor work can be linked to opex and self-sufficiency of the plant.

Improvements, to compression work, e.g., a reduction in the amount, are provided in embodiments of the present inventions for a gas-to-methanol plant using an engine-based reformer to produce the syngas intermediate. Reduction in compressor work can be accomplished by several devices and processes, for example, through using one or more of: (a) reducing the amount of nitrogen; (b) increasing back-pressure of the engine from standard 1 or 2 bar, to up to 5 bar; (c) use of a turbo-expander to recover much of the compression work, thus lowering the cost, among other efficiencies, to operate a plant; and (d) utilizing an intensified synthesis loop to achieve acceptable methanol synthesis at lower overall pressure.

Monetization of stranded gas resources, such as associated gas from oil production, generally involves that the gas be converted to a product or intermediate that is a liquid (e.g., methanol, FT liquids) or easily condensable gas (e.g., ammonia) at ambient temperatures. Both ammonia and methanol syntheses are strongly exothermic, equilibrium limited, and involve an overall reduction in the number of moles during reaction. Because of the exothermicity, low temperatures favor good conversion; however, low temperatures also reduce catalyst activity requiring larger reactors and higher catalyst loading imposing a practical minimum reactor temperature. Increasing the reactor pressure also shifts the equilibrium towards higher conversion. In embodiments methanol plants operate the methanol synthesis at elevated pressures of nominally 50 bar, much higher than the nominal exhaust pressure from an engine-based reformer, and in particular, air-breathing engine-based reformers. This high pressure requires substantial compression work and the associated high capex and opex. Despite the high pressure, the single-pass conversion is still rather low and therefore there can be the use of recycle loops to increase the overall conversion at the expense of larger reactors and more complex and costly downstream separations.

In a preferred embodiment, the one or more of the devices and processes to reduce compressor work is used as part of a small, modular, distributed, self-sufficient plant for conversion of stranded gas to fungible, easily transportable products using an engine-based reformer and syngas intermediate.

Embodiments of the present inventions have a reciprocating engine to produce reprocessed gas, preferably syngas, are advantageous under certain circumstances, and have one or more of the devices and processes to reduce compressor work associated with, or used in conjunction with, the gas-to-liquid system and method. Embodiments of the present systems are preferably modular and can easily and readily be positioned at difficult to access locations, locations with limited area for placement of the systems, and combinations and variations of these, where flare gas is generated.

An objective of embodiments of the present inventions, among others, is to reduce the compressor work required for the conversion of otherwise uneconomic hydrocarbon-based fuel (e.g., stranded, associated, landfill, flared, small-pocket, remote gas) to value-added, easily transported products (such as methanol, ethanol, ammonia, dimethyl-ether, F-T liquids, and other fuels or chemicals) using an autonomous, modular system.

Embodiments of the present inventions focus on reciprocating engines and methods of operating those engines to handle the variable combustion properties of the fuel sources, including fuel sources from an oil field or landfill, such as flare gas. One of the reasons that these gases are non-economic is that the fuel composition is highly variable. A consequence of composition variation is the resulting effect on combustion properties such as: heating value, cetane number (delay in time of ignition of fuel), and octane number (resistance to pre-ignition due to compression). These variations can occur from source-to-source, from day-to-day at the same source (transients), from season-to-season (particularly bio-gases), and over time as the source ages. Embodiments of the present address and solve these problems, among other things.

Conventional air-breathing reciprocating engines typically are designed to operate using fuels with a narrow fuel specification. For example, the compression ratio of automotive gasoline engines is selected for the quality of fuel used. The "regular" gasoline in the United States has an octane rating of 86-87. A higher performance (e.g., higher compression ratio) engine may require premium gasoline with octane rating of 91-94.

An embodiment of the present invention is the configuration, operation and both, of a commercial reciprocating engine (e.g., off the shelf engine) to the production of syngas by operating it at rich conditions with high fuel-to-air ratio (equivalence ratio in the range 1.5 to 2.5). To allow the engine to operate off-design from its intended design point, and to operate satisfactorily using fuel that varies over a wide range of octane and cetane numbers, this invention modifies operating engine parameters including compression ratio, inlet manifold air temperature, inlet manifold air pressure, and engine speed. This embodiment applies to both compression ignition engines (diesel cycle) and spark ignition engines (otto cycle). For spark ignition engines, the spark timing can also be used to adapt the engine operation to fuel variation. Preferably this embodiment is used in a system having one or more of the present devices and processes to reduce compressor work.

Embodiments of the present inventions can be used to take uneconomic hydrocarbon-based fuels at a well-head and remote locations that are primarily gaseous hydrocarbons and convert them to a more valuable easily condensable gas or liquid compound, such as methanol. One source of fuel could be associated gas or flare gas, which is produced as a byproduct at oil wells. Another source is flare gas produced by industrial processes, such as refinery flare gas. Another source could be biogas from landfill or anaerobic digesters.

Embodiments of the present inventions are particularly useful in small-scale plants, using one or a plurality of syngas engines, targeting 600,000 scfd (standard cubic feet per day) of inlet gas. The size of such a plant could vary from 80,000 scfd to 3,000,000 scfd, or 20,000 scfd to 100,000 scfd.

Embodiments of the present inventions can be incorporated into one or more modular, interconnected skids or containers that are built at a central fabricator shop location and then installed at a field location. A system comprises a small number of modules and when connected at site they form an integrated system. The modular nature of the assembly enables application to remote locations under a range of inlet gas feed volumes, with a minimum of field labor.

Turning to FIG. 3 there is shown a generalized embodiment of a system and method for the conversion of a waste gas, e.g., flare gas, into a value-added product, e.g., methanol. The system 100 has a reformer stage 101 and a synthesis stage 102. The system 100 has an air intake 110, that feeds air through into a compressor 111, which compresses the air. The compressed air is feed through heat exchanger 120*a* into a mixer 113. The system has a waste gas, e.g., flare gas, intake 114. The waste gas flows through a heat exchanger 120*b* into the mixer 113. The mixer 113, provides a predetermined mix of air and waste gas, as taught and disclosed in this specification, to a reformer 114.

The fuel-air mixture that is formed in mixer 113 is preferably rich, more preferably having an overall fuel/air equivalence ratio (0 or ER) greater than 1, greater than 1.5, greater than 2, greater than 3, from about 1.5 to about 4.0, about 1.1 to about 3.5, about 2 to about 4.5, and about 1.1 to about 3, and greater values.

It being understood that oxygen can be added to the air. And that water or steam may also be injected into the mixture of air and fuel, or to air or fuel individually. From about 1 to about 20% (molar) water can be injected, from about 10 to about 15% (molar water), from about 5 to about 17% (molar) water, more than 5% (molar) water, more than 10% (molar) water, more than 15% (molar) water, and less than 25% (molar) water, water can be injected. Following oxygen enrichment, the combustion air can have from about 21% to about 90% oxygen. "Air-breathing" reformers, and air breathing engines as used herein are understood to also include engines using air modified with the addition of water, oxygen or both.

The reformer 114 combusts the predetermined mixture of waste gas and air (e.g., flare gas and air) to form a reprocessed gas (e.g., syngas). The syngas flows through heat exchangers 120*a*, 120*b* and into a filter 115, e.g., a particulate filter.

After passing through the filter 115, the reprocessed gas (e.g., syngas) flows to a guard bed reactor assembly 116, having two guard bed reactors 116*a*, 116*b*. The guard bed reactor 116 has materials, e.g., catalysts, that remove contaminates and other materials from the syngas that would harm, inhibit or foul later apparatus and processes in the system. For example, the guard bed reactor 116 may contain catalyst, adsorbents, or other materials to remove sulfur (e.g., iron sponge, zinc oxide or similar) and halogenated compounds.

After leaving the guard bed reactor 116, the reprocessed gas (e.g., syngas) flows to a deoxygenation ("deoxo") reactor 117. The deoxo reactor 117 removes excess oxygen from the reprocessed gas (e.g., syngas) by oxidizing combustible compounds in the mixture such as methane, CO, and H₂, where the oxygen is converted to water. Catalyst for the deoxo reaction are platinum, palladium, and other active materials supported on alumina or other catalyst support materials.

The system 100 has a cooling system 150, which uses a cooling fluid, e.g., cooling water, that is flow through cooling lines, e.g., 151. Other means of cooling, for example direct air cooling, are also contemplated.

After leaving the deoxo reactor 117, the reprocessed gas (e.g., syngas) flows to heat exchanger 120*c*. The reprocessed gas (e.g., syngas) then flows from heat exchanger 120*c* to a water removal unit 118, e.g., a water knockout drum, demister, dryer, membrane, cyclone, desiccant or similar devices, where water is removed from the reprocessed gas (e.g., syngas). In general, the reprocessed gas (e.g., syngas) upon leaving unit 118 should have less than about 5% water by weight, less than about 2%, less than about 1% and less than about 0.1% water.

The overall (general) reaction for partial oxidation of a rich fuel/air mixture to syngas is given by the equation:

$$\Theta CH_4 + 2[O_2 + 3.76\ N_2] \rightarrow aCO + bH_2 + cCO_2 + dH_2O + 7.52\ N_2$$

Where stoichiometric coefficients a, b, c and d are determined by the chemical kinetics, conservation of atomic species, and the reaction conditions.

In addition to syngas, minor constituents in the gas exiting the reformer can include water vapor, $CO_2$, and various unburned hydrocarbons.

After leaving unit 118, the now dry reprocessed gas (e.g., syngas) is in the synthesis stage 102. In stage 102 the now dry reprocessed gas (e.g., syngas) flows to an assembly 130. Assembly 130 provides for the controlled addition of hydrogen from line 131 into the now dry reprocessed gas (e.g., syngas). In this manner the ratio of the syngas components can be adjusted and controlled to a predetermined ratio. The hydrogen is provided from hydrogen separation unit 139. The ratio-adjusted dry reprocessed gas (e.g., syngas) leaves assembly 130 and flow to compressor 132. Compressor 132 compresses the reprocessed gas (e.g., syngas) to an optimal pressure as taught and disclosed in this specification, for use the synthesis unit 133. Optionally, the synthesis unit 133 is a two-stage unit with a first reactor unit 133*a* and a second reactor unit 133*b*. Each reactor is a pressure vessel where process gas flows through a catalyst bed in an exothermic reaction. The catalyst bed tubes are typically emersed in a pool of cooling water at a controlled temperature and pressure. Synthesis unit 133 also has heat exchanger 120*e*.

The synthesis unit 133 converts the ratio-adjusted dry reprocessed gas (e.g., syngas) into a value-added product (e.g., methanol, ethanol, mixed alcohols, ammonia, dimethyl-ether, F-T liquids, and other fuels or chemicals). The value-added product (e.g., methanol, etc.) flows into to heat exchanger 120*d*. The value-added product (e.g., methanol, etc.) flows to a collection unit 140. The collection unit 140 collects the value-added product (e.g., methanol, etc.) and flows it through line 141 for sale, holding, or further processing.

Generally, the syngas is compressed to a pressure of about 15 to about 100 bar and preferably 30-50 bar, and about 25 to about 80 bar, at least about 10 bar, at least about 25 bar and at least about 50 bar, and greater and lower pressures. The temperature of the pressurized syngas is adjusted to a temperature of about 150° C. to about 350° C. and preferably 250° C., about 200° C. to about 300° C., about 250° C. to about 375° C., greater than 125° C., greater than 150° C., greater than 200° C., greater than 250° C., greater than 350° C., and less than 400° C., and higher and lower temperatures. The pressure and temperature-controlled syngas is then fed to reactors for transforming the syngas into a more useful, more easily transportable, and economically viable product such as methanol, ethanol, mixed alcohols, ammonia, dimethyl-ether, F-T liquids, and other fuels or chemicals. In a preferred embodiment methanol is produced using the overall reaction of syngas to methanol via reactions for hydrogenation of CO, hydrogenation of $CO_2$, and reverse water-gas shift using actively cooled reactors, such as a heat-exchanged reactor or boiling water reactor, and a copper containing catalyst such as $Cu/ZnO/Al_2O_3$ or the like.

Generally, and in preferred embodiments, the characteristic length scale of the reactors used in this system are sufficiently small (e.g., micro-channel or mini-channels) that they can be shaped into unconventional shapes and topologies using new 3D printing techniques for metals and other high-temperature materials, thus allowing compact packaging and tight control over reaction conditions. Other strategies for intensification of the downstream synthesis reactions can also be considered, such as selectively removing the product from the reactor in-situ, or in a closely coupled fashion, to shift the equilibrium-limited reaction to higher conversion. This process intensification may minimize the need for large recycle streams or allow the reaction to proceed at milder conditions (e.g., lower pressure) thereby increasing process safety margins and providing other benefits.

Typically, in reacting the syngas to form the higher value product, unreacted $H_2$ is also produced. The $H_2$ can be collected and sold, or used to power the gas turbine or a second generator to produce additional electric power.

In general, the ratio of $H_2/CO$ in the syngas produced by the engine can be tailored to the downstream conversion process. For example, for methanol synthesis or Fischer-Tropsch (F-T) synthesis the ideal $H_2/CO$ ratio is 2-3. For ammonia synthesis or for hydrogen production, the maximum possible $H_2/CO$ ratio is desirable and can be enhanced by, for example, steam addition to promote the water-gas shift reaction. For ammonia and hydrogen production, the CO is not required by the downstream synthesis. As such, CO and $CO_2$ byproducts can be collected, sequestered, stored or utilized for other purposes.

The collection unit 140 also has a line that flows gas separated from the value-added product (e.g., methanol, etc.) to valve 135, where it is sent to hydrogen separation unit 139, to a recycle loop 136 or both. The recycle loop has compressor 134 and valve 138 to feed the unreacted syngas back into the synthesis unit 133. Hydrogen separation can be achieved by via membrane separation or pressure swing absorption (PSA) or the like in the hydrogen separation unit 139.

Preferably, the system and process of FIG. 3 has one or more of the devices and processes to reduce compressor work. Thus, the system and process of FIG. 3 can have or use one or more of: (a) reducing the amount of nitrogen; (b) increasing back-pressure of the engine from standard 1 or 2 bar, to up to 5 bar; (c) use a turbo-expander to recover much of the compression work, thus lowering the cost, among other efficiencies, to operate a plant; and (d) utilizing an intensified synthesis loop to achieve acceptable methanol synthesis at lower overall pressure. These devices and processes to reduce compressor work can be used in conjunction with the system and process of FIG. 3, as a part of (e.g., modular, integral, and combinations thereof) the system and process of FIG. 3, and combinations and variations of this manner of association.

The overall conversion process from fuel to useful product can be described using a T-S diagram, using properties of air, in an air standard approximation of the process. Turning to FIG. 11 there is shown a temperature-entropy (T-S) diagram for the general operation and thermodynamics for the operation of flare gas to methanol systems of the type shown, for example, in FIG. 3. The overall conversion process from waste gas, e.g., flare gas, to useful product, e.g., methanol, is described using the T-S diagram of FIG. 11. This diagram uses the properties of air, in an air standard approximation of the process. FIG. 11 outlines the general solutions and operation of systems such as shown in FIG. 3 from the point of thermodynamics, temperature and pressure. The diagram shows the starting point of the process at ambient conditions, the high temperature and the pressure conditions for rich, partial oxidation, in the reformer, and for high pressure lower temperature reactions for the synthesis of methanol. Thus, there is shown temperature vs entropy dashed line 201 for 60 bar pressure, dashed line 202 for 30 bar pressure, dashed line 203 for 8 bar pressure, and dashed line 204 for 1 bar pressure. (1 atmosphere is equivalent to 1.013 bar.) The temperature and pressure for the incoming air (e.g., FIG. 3, 110) and the waste gas (e.g., flare gas) is at point 206 (FIG. 11). The operating conditions for the reformer stage (e.g., FIG. 3, 101) is shown in zone 210 (FIG. 11). Zone 210 has temperatures at and above 900° C. Zone 210 has two sub-zones, 210a and 210b. Sub-zone 210a is a lower pressure zone (from less than 1 bar to about 25 bar). Sub-zone 210b is a higher pressure zone (from about 20 bar to about 100 bar), and in particular, a high pressure zone for rich, partial oxidation conditions in the reformer (e.g., FIG. 3, 114), which are the preferred conditions for the embodiments of the present inventions. The optimum operation for the synthesis stage (e.g., FIG. 3, 131) is shown in zone 211 for methanol synthesis. The zone 211 is in a temperature of 200-300° C. and a pressure of about 20 bar to 100 bar. A preferred zone for methanol production is 200-300° C. and a pressure of 30-100 bar.

Thus, FIG. 11 is a graphic representation of conditions that may generally be used in a system to provide for the conversion of flare gas to an end product, in this case methanol, and to preferably do so with a neutral (i.e., provides all energy needed to operate the system and process, or positive, provides excess energy) energy balance. The Specific Entropy axis (horizontal axis) is in units of kJ/kg ° C., and describes the entropy per unit mass of air. This type of diagram is a convenient way to show physical processes, such as compression and expansion (nearly vertical lines between pressure levels, and heat exchange (usually at near constant pressure). Ideal compression or expansion is isentropic, meaning no change in entropy, between two pressure levels. Compression with real equipment is non-isentropic as indicated by non-vertical lines. The Temperature axis (vertical axis) is in ° C. and describes the fluid temperature, assumed to have properties similar to air. The relationship between temperature and lines of constant pressure are governed by the physical properties of the fluid. One of the benefits of the T-S diagram is that is allows a visual representation of the physical processes and the relationship between components.

The partial oxidation window 210 defines a region of temperature and pressure where the key partial-oxidation (PDX) reactions take place to produce syngas. The region defines the reaction conditions that lead to reaction timescales that are commensurate with the combustion residence in reformers (e.g., a gas turbine, typically 5-50 ms). In general the PDX reaction happens at much higher temperatures than the downstream synthesis (e.g., methanol) reactions, which means that the temperature needs to be reduced in a heat exchanger prior to the methanol reactor.

The methanol synthesis window 211 defines the region of temperature and pressure where the methanol synthesis reactions take place. The region defines the reaction conditions that lead to reasonable equilibrium conversion for this equilibrium-limited reaction. For this exothermic process, lower temperatures are favored for equilibrium conversion but are constrained on the low end by ensuring sufficient catalyst activity. Higher pressures yield higher equilibrium concentrations due to the net decrease in moles in the reaction but require the cost of compression and design for high pressure. While FIG. 11 specifically shows a methanol synthesis window, it is understood that other possible downstream synthesis reactions, e.g. Fischer-Tropsch synthesis, require similar conditions.

FIG. 4 shows an embodiment of a system and method for the conversion of flare gas into a value-added product, e.g., methanol. The system 1600 has a reformer stage 1601 and a synthesis stage 1602. The system 1600 has an air intake, that feeds air into a compressor 1611, which compresses the air. The compressed air is fed through a heat exchanger into a mixer. The system has a flare gas intake. The flare gas flows through a heat exchanger into the mixer. The mixer provides a predetermined mix of air and waste gas, as taught and disclosed in this specification, to a reformer 1614, which is a reciprocating engine.

The fuel-air mixture that is formed in the mixer is preferably rich, more preferably having an overall fuel/air equivalence ratio (0 or ER) greater than 1, greater than 1.5, greater than 2, greater than 3, from about 1.5 to about 4.0, about 1.1 to about 3.5, about 2 to about 4.5, and about 1.1 to about 3, and greater values.

It is understood that oxygen can be added to the air. Water or steam may also be injected into the mixture of air and fuel, or to air or fuel individually. From about 1 to about 20% (molar) water can be injected, from about 10 to about 15% (molar water), from about 5 to about 17% (molar) water, more than 5% (molar) water, more than 10% (molar) water, more than 15% (molar) water, and less than 25% (molar) water, water can be injected. Following oxygen enrichment, the combustion air can have from about 21% (molar) to about 90% (molar) oxygen. "Air-breathing" reformers, and air breathing engines as used herein are understood to also include engines using air modified with the addition of water, oxygen or both.

The reciprocating engine 1614 partially combusts the predetermined mixture of flare gas and air to form syngas. The syngas flows through heat exchangers and into a filter, e.g., a particulate filter.

After passing through the filter, the syngas flows to a guard bed reactor assembly, optionally having two guard bed reactors. After leaving the guard bed reactor, the syngas flows to a deoxo reactor. The deoxo reactor removes excess oxygen from the reprocessed gas (e.g., syngas).

The system has a cooling system, which uses a cooling fluid, e.g., cooling water, that is flowed through cooling lines. Other means of cooling, for example direct air cooling, are also contemplated.

After leaving the deoxo reactor, the syngas flows to a heat exchanger to cool the gas. The reprocessed gas (e.g., syngas) then flows from the heat exchanger to a water removal unit, e.g., a water knockout drum, demister, dryer, membrane, cyclone, desiccant or similar, where water is removed from the syngas. In general, the syngas upon leaving unit the water removal unit should have less than about 5% water by weight, less than about 2%, less than about 1% and less than about 0.1% water.

After leaving the water removal unit, the now dry syngas flows into the synthesis stage 1602. In stage 1602 the now dry syngas flows to an assembly that provides for the controlled addition of a hydrogen-rich gas into the now dry syngas. In this manner the ratio of the syngas components can be adjusted and controlled to a predetermined ratio. The hydrogen is provided from hydrogen separation unit 1639. The ratio-adjusted dry syngas leaves the assembly and flows to compressor 1632. Compressor 1632 compresses the syngas to an optimal pressure as taught and disclosed in this specification, for use the synthesis unit 1633, which is optionally a two-stage unit with a first reactor unit 1633a and a second reactor unit 1633b. Synthesis unit 1633 also has recuperative heat exchanger.

The synthesis unit 1633 converts the ratio-adjusted dry syngas into a value-added product, e.g., methanol. The methanol flows into to heat exchanger (i.e., cooler) and then to a collection unit 1640. The collection unit 1640 collects the condensed methanol and flows it through a line for sale, holding, or further processing.

The collection unit 1640 also has a line that flows unreacted gas separated from the methanol to a tee-connector, where it is sent to hydrogen separation unit 1639, to a recycle loop or both. The recycle loop has a compressor and a valve to feed the methanol back into the synthesis unit 1633.

Preferably, the system and process of FIG. 4 is operated as discussed above under the conditions shown in FIG. 5. In embodiments the system and process of FIG. 4 may have one or more of the devices and processes to reduce compressor work. Thus, the system and process of FIG. 4 can have or use one or more of: (a) reducing the amount of nitrogen; (b) increasing back-pressure of the engine from standard 1 or 2 bar, to up to 5 bar; (c) use a turbo-expander to recover much of the compression work, thus lowering the cost, among other efficiencies, to operate a plant; and (d) utilizing an intensified synthesis loop to achieve acceptable methanol synthesis at lower overall pressure. These devices and processes to reduce compressor work can be used in conjunction with the system and process of FIG. 4, as a part of (e.g., modular, integral, and combinations thereof) the system and process of FIG. 4, and combinations and variations of this manner of association.

Turning to FIG. 6 there is shown an embodiment of a system and method for the conversion of flare gas into a value-added product, e.g., methanol. The system 1800 is configured to reduce the compression work required by raising the back pressure of the engine above ambient, up to about 5 bar.

The system 1800 has a reformer stage 1801 and a synthesis stage 1802. The system 1800 has an air intake, that feeds air into a compressor 1811, which compresses the air. The compressed air is fed through a heat exchanger into a mixer. The system has a flare gas intake. The flare gas flows through a heat exchanger 1820b into the mixer 1813. The mixer 1813, provides a predetermined mix of air and waste gas, as taught and disclosed in this specification, to a reformer 1814, which is a reciprocating engine.

The fuel-air mixture that is formed in the mixer is preferably rich, more preferably having an overall fuel/air equivalence ratio (0 or ER) greater than 1, greater than 1.5, greater than 2, greater than 3, from about 1.5 to about 4.0, about 1.1 to about 3.5, about 2 to about 4.5, and about 1.1 to about 3, and greater values.

It is understood that oxygen can be added to the air. Water or steam may also be injected into the mixture of air and fuel, or to air or fuel individually. From about 1 to about 20% (molar) water can be injected, from about 10 to about 15% (molar water), from about 5 to about 17% (molar) water, more than 5% (molar) water, more than 10% (molar) water, more than 15% (molar) water, and less than 25% (molar) water, water can be injected. Following oxygen enrichment, the combustion air can have from about 21% (molar) to about 90% (molar) oxygen. "Air-breathing" reformers, and air breathing engines as used herein are understood to also include engines using air modified with the addition of water, oxygen or both.

The reciprocating engine 1814 partially combusts the predetermined mixture of flare gas and air to form syngas. The syngas flows through heat exchangers and into a filter, e.g., a particulate filter.

After passing through the filter, the syngas flows to a guard bed reactor assembly, optionally having two guard bed reactors. After leaving the guard bed reactor, the syngas flows to a deoxo reactor. The deoxo reactor removes excess oxygen from the reprocessed gas (e.g., syngas).

The system has a cooling system, which uses a cooling fluid, e.g., cooling water, that is flowed through cooling lines. Other means of cooling, for example direct air cooling, are also contemplated.

After leaving the deoxo reactor, the syngas flows to a heat exchanger to cool the gas. The reprocessed gas (e.g., syngas) then flows from the heat exchanger to a water removal unit, e.g., a water knockout drum, demister, dryer, membrane, cyclone, desiccant or similar, where water is removed from the syngas. In general, the syngas upon leaving unit the water removal unit should have less than about 5% water by weight, less than about 2%, less than about 1% and less than about 0.1% water.

After leaving the water removal unit, the now dry syngas is in the synthesis stage 1802. In stage 1802 the now dry syngas flows to an assembly that provides for the controlled addition of a hydrogen-rich gas into the now dry syngas. In this manner the ratio of the syngas components can be adjusted and controlled to a predetermined ratio. The hydrogen is provided from hydrogen separation unit 1839. The ratio-adjusted dry syngas leaves the assembly and flows to compressor 1832. Compressor 1832 compresses the syngas to an optimal pressure as taught and disclosed in this specification, for use the synthesis unit 1833, which is optionally a two-stage unit with a first reactor unit 1833*a* and a second reactor unit 1833*b*. Synthesis unit 1833 also has a recuperative heat exchanger.

The synthesis unit 1833 converts the ratio-adjusted dry syngas into a value-added product, e.g., methanol. The methanol flows into to heat exchanger (i.e., cooler) and then to a collection unit 1840. The collection unit 1840 collects the condensed methanol and flows it through a line for sale, holding, or further processing.

The collection unit 1840 also has a line that flows unreacted gas separated from the methanol to a tee-connector, where it is sent to hydrogen separation unit 1839, to a recycle loop or both. The recycle loop has a compressor and a valve to feed the methanol back into the synthesis unit 1833.

Stage 1802 has a line 1883 for taking depleted methanol from unit 1833*b* and sending it through heat exchanger 1820*d*. The stage 1802 has a methanol desorber 1880 that has pump 1881. Line 1882 for desorber 1880 flows methanol rich product to heat exchanger 1820*g*.

In the operation of system 1800, the preferred process uses a two-stage methanol synthesis reactor with reactive separation in the second stage (Rxtr 2) 1833*b* only. The first stage (Rxtr 1) 1833*a* is generally far from equilibrium and does not warrant reactive separation. The example shown in this figure is reactive absorption or membrane separation with a liquid sweep. Methanol is selectively removed from the reactor in situ resulting in a methanol-depleted gaseous stream containing primarily unreacted syngas and a methanol-rich absorbent stream. Compared to other embodiments, the primary recycle loop is not used because of the improved single-pass conversion. The methane-rich absorbent stream passes through a valve to reduce the pressure and desorb the methanol which is then condensed and sent to the product stream. The absorbent, now in a regenerated state, is pumped back to the synthesis pressure and recirculated to the reactor. The pumping work for the absorbent is minimal compared to the syngas compressor work because the liquid absorbent is nearly incompressible. The reactor could be a trickle bed or a membrane reactor with the liquid absorbent (sweep) on the permeate side of the membrane. Any methanol that does not partition into the absorbent is condensed out of the gas phase in a downstream separation step and combined with the methanol product stream.

In embodiments, the system and process of FIG. 6 may have one or more of the devices and processes to reduce compressor work. Thus, the system and process of FIG. 6 can have or use one or more of: (a) reducing the amount of nitrogen; (b) increasing back-pressure of the engine from standard 1 or 2 bar, to up to 5 bar; (c) use a turbo-expander to recover much of the compression work, thus lowering the cost, among other efficiencies, to operate a plant; and (d) utilizing an intensified synthesis loop to achieve acceptable methanol synthesis at lower overall pressure. These devices and processes to reduce compressor work can be used in conjunction with the system and process of FIG. 6, as a part of (e.g., modular, integral, and combinations thereof) the system and process of FIG. 6, and combinations and variations of this manner of association.

In an embodiment, the systems and processes utilize reactive separation of products. This system and process, in general, uses a two-stage methanol synthesis reactor with reactive separation in the second stage (Rxtr 2) only. The first stage (Rxtr 1) is generally far from equilibrium and does not warrant reactive separation. The system has reactive absorption or membrane separation with a liquid sweep. Methanol is selectively removed from the reactor in situ resulting in a methanol-depleted gaseous stream containing primarily unreacted syngas and a methanol-rich absorbent stream. Compared to other systems, such as shown in FIG. 3, the primary recycle loop may not be, and preferably is not required because of the improved single-pass conversion. The methane-rich absorbent stream passes through a valve to reduce the pressure and desorb the methanol which is then condensed and sent the product stream. The absorbent, now in a regenerated state, is pumped back to the synthesis pressure and recirculated to the reactor. The pumping work for the absorbent is minimal compared to the syngas compressor work because the liquid absorbent is nearly incompressible. The reactor could be a trickle bed or a membrane reactor with the liquid absorbent (sweep) on the permeate side of the membrane. Any methanol that does not partition into the absorbent is condensed out of the gas phase in a downstream separation step and combined with the methanol product stream. This system and process may have one or more of the devices and processes to reduce compressor work.

Turning to FIG. 7 there is shown an embodiment of a system and method for the conversion of flare gas into a value-added product, e.g., methanol. The system 1900 has a reformer stage 1901 and a synthesis stage 1902. The system 1900 has an air intake, that feeds air into a compressor 1911, which compresses the air. The compressed air is fed through heat exchanger into a mixer. The system has a flare gas intake. The flare gas flows through a heat exchanger 1920*b* into the mixer 1913. The mixer 1913, provides a predetermined mix of air and waste gas, as taught and disclosed in this specification, to a reformer 1914, which is a reciprocating engine.

The fuel-air mixture that is formed in the mixer is preferably rich, more preferably having an overall fuel/air equivalence ratio (0 or ER) greater than 1, greater than 1.5, greater than 2, greater than 3, from about 1.5 to about 4.0, about 1.1 to about 3.5, about 2 to about 4.5, and about 1.1 to about 3, and greater values.

It is understood that oxygen can be added to the air. Water or steam may also be injected into the mixture of air and fuel, or to air or fuel individually. From about 1 to about 20% (molar) water can be injected, from about 10 to about 15% (molar water), from about 5 to about 17% (molar) water, more than 5% (molar) water, more than 10% (molar) water, more than 15% (molar) water, and less than 25% (molar) water, water can be injected. Following oxygen enrichment, the combustion air can have from about 21% (molar) to about 90% (molar) oxygen. "Air-breathing" reformers, and air breathing engines as used herein are understood to also include engines using air modified with the addition of water, oxygen or both.

The reciprocating engine 1914 partially combusts the predetermined mixture of flare gas and air to form syngas. The syngas flows through heat exchangers and into a filter, e.g., a particulate filter.

After passing through the filter, the syngas flows to a guard bed reactor assembly, optionally having two guard bed reactors. After leaving the guard bed reactor, the syngas flows to a deoxo reactor. The deoxo reactor removes excess oxygen from the reprocessed gas (e.g., syngas).

The system has a cooling system, which uses a cooling fluid, e.g., cooling water, that is flowed through cooling lines. Other means of cooling, for example direct air cooling, are also contemplated.

After leaving the deoxo reactor, the syngas flows to a heat exchanger to cool the gas. The reprocessed gas (e.g., syngas) then flows from the heat exchanger to a water removal unit, e.g., a water knockout drum, demister, dryer, membrane, cyclone, desiccant or similar, where water is removed from the syngas. In general, the syngas upon leaving unit the water removal unit should have less than about 5% water by weight, less than about 2%, less than about 1% and less than about 0.1% water.

After leaving the water removal unit, the now dry syngas is in the synthesis stage 1902. In stage 1902 the now dry syngas flows to an assembly that provides for the controlled addition of a hydrogen-rich gas from line into the now dry syngas. In this manner the ratio of the syngas components can be adjusted and controlled to a predetermined ratio. The hydrogen is provided from hydrogen separation unit 1939. The ratio-adjusted dry syngas leaves the assembly and flows to compressor 1932. Compressor 1932 compresses the syngas to an optimal pressure as taught and disclosed in this specification, for use the synthesis unit 1933, which is optionally a two-stage unit with a first reactor unit 1933a and a second reactor unit 1933b. Synthesis unit 1933 also has recuperative heat exchanger 1920e.

The synthesis unit 1933 converts the ratio-adjusted dry syngas into a value-added product, e.g., methanol. The methanol flows into to heat exchanger (i.e., cooler) and then to a collection unit 1940. The collection unit 1940 collects the condensed methanol and flows it through a line for sale, holding, or further processing.

The collection unit 1940 also has a line that flows unreacted gas separated from the methanol to a tee-connector, where it is sent to hydrogen separation unit 1939, to a recycle loop or both. The recycle loop has a compressor and a valve to feed the methanol back into the synthesis unit 1933.

Stage 1902 has a line 1983 for taking water-depleted methanol from unit 1933b and sending it through heat exchanger 1920d. The stage 1902 has a line 1987 from unit 1833b that removes water-rich product.

The system 1900 is for the gas-to-liquids process with reactive separation of byproducts. The process uses a two-stage methanol synthesis reactor with reactive separation in the second stage (Rxtr 2) 1933b only. The first stage (Rxtr 1) 1833a is generally far from equilibrium and does not warrant reactive separation. The example shown in this figure is membrane separation with a gaseous sweep. Water (a byproduct of $CO_2$ hydrogenation to methanol) is selectively removed from the reactor 1833b (via line 1987) in situ resulting in a water-depleted gaseous stream containing primarily unreacted syngas and a water-rich sweep gas. In this embodiment a primary recycle loop is not use because of the improved single-pass conversion. Further, in this embodiment, regeneration of the sweep stream (e.g., air in this embodiment) is not performed. The membrane reactor could use a polymeric or ceramic membrane material that is perm-selective to water and a sweep gas (e.g., air) on the permeate side of the membrane. Removing the water shifts the equilibrium towards the products. The reverse water-gas shift reaction converts $CO_2$ to CO, and so this approach also helps convert $CO_2$ to more reactive CO. As such, this approach is especially attractive for $CO_2$-rich syngas streams such as those produced from partial oxidation. Methanol is condensed out of the gas phase in a downstream separation step and combined with the methanol product stream.

In embodiments the system and process of FIG. 7 may have one or more of the devices and processes to reduce compressor work. Thus, the system and process of FIG. 7 can have or use one or more of: (a) reducing the amount of nitrogen; (b) increasing back-pressure of the engine from standard 1 or 2 bar, to up to 5 bar; (c) use a turbo-expander to recover much of the compression work, thus lowering the cost, among other efficiencies, to operate a plant; and (d) utilizing an intensified synthesis loop to achieve acceptable methanol synthesis at lower overall pressure. These devices and processes to reduce compressor work can be used in conjunction with the system and process of FIG. 7, as a part of (e.g., modular, integral, and combinations thereof) the system and process of FIG. 7, and combinations and variations of this manner of association.

In an embodiment, the systems and processes utilize reactive separation of byproducts. The process uses a two-stage methanol synthesis reactor with reactive separation in the second stage (Rxtr 2) only. The first stage (Rxtr 1) is generally far from equilibrium and does not warrant reactive separation. The example shown in this figure is membrane separation with a gaseous sweep. Water (a byproduct of $CO_2$ hydrogenation to methanol) is selectively removed from the reactor in situ resulting in a water-depleted gaseous stream containing primarily unreacted syngas and a water-rich sweep gas. Compared to other systems, such as shown in FIG. 3, the primary recycle loop may not be and preferably is not required because of the improved single-pass conversion. Further, compared to other embodiments, such as shown in FIG. 6, regeneration of the sweep stream (e.g., air in this embodiment), may not be and preferably is not required. The membrane reactor could use a polymeric or ceramic membrane material that is perm-selective to water and a sweep gas (e.g., air) on the permeate side of the membrane. Removing the water shifts the equilibrium towards the products. The reverse water-gas shift reaction converts $CO_2$ to CO, and so this approach also helps convert $CO_2$ to more reactive CO. As such, this approach is especially attractive for $CO_2$-rich syngas streams such as those produced from partial oxidation. Methanol is condensed out of the gas phase in a downstream separation step and combined with the methanol product stream. This system and process may have one or more of the devices and processes to reduce compressor work.

Turning to FIG. 8 there is shown an embodiment of a system and method for the conversion of flare gas into a value-added product. The system 800 has a reformer stage 801 and a synthesis stage 802. The system 800 has an air intake 810, that feeds air into a compressor 811, which compresses the air. The compressed air is fed through heat exchanger 820a into a mixer 813. The system has a flare gas intake 884. The flare gas flows through a heat exchanger 820b into the mixer 813. The mixer 813, provides a predetermined mix of air and flare gas, as disclosed and taught in greater detail in this specification, to a reformer 814, which is a reciprocating engine.

The fuel-air mixture that is formed in mixer 813 is preferably rich, more preferably having an overall fuel/air equivalence ratio (0 or ER) greater than 1, greater than 1.5, greater than 2, greater than 3, from about 1.5 to about 4.0, about 1.1 to about 3.5, about 2 to about 4.5, and about 1.1 to about 3, and greater values.

It is understood that oxygen can be added to the air. Water or steam may also be injected into the mixture of air and fuel, or to air or fuel individually. From about 1 to about 20% (molar) water can be injected, from about 10 to about 15% (molar water), from about 5 to about 17% (molar) water, more than 5% (molar) water, more than 10% (molar) water, more than 15% (molar) water, and less than 25% (molar) water, water can be injected. Following oxygen enrichment, the combustion air can have from about 21% (molar) to about 90% (molar) oxygen. "Air-breathing" reformers, and air breathing engines as used herein are understood to also include engines using air modified with the addition of water, oxygen or both.

The reciprocating engine 814 partially combusts the predetermined mixture of flare gas and air to form syngas. The syngas flows through heat exchangers 820a, 820b and into a filter 815, e.g., a particulate filter.

After passing through the filter 815, the syngas flows to a guard bed reactor assembly 816, optionally having two guard bed reactors 816a, 816b. The guard bed reactor 816 has materials, e.g., catalysts, that remove contaminates and other materials from the syngas that would harm, inhibit or foul later apparatus and processes in the system. For example, the guard bed reactor 816 may contain catalyst or other materials to remove sulfur (e.g., iron sponge, zinc oxide or similar) and halogenated compounds.

After leaving the guard bed reactor 816, the syngas flows to a deoxo reactor 817. The deoxo reactor 817 removes excess oxygen from the reprocessed gas (e.g., syngas) by oxidizing combustible compounds in the mixture such as methane, CO, and $H_2$, where the oxygen is converted to water. Catalyst for the deoxo reaction are platinum, palladium, and other active materials supported on alumina or other catalyst support materials.

The system 800 has a cooling system 850, which uses a cooling fluid, e.g., cooling water, that is flowed through cooling lines, e.g., 851. Other means of cooling, for example direct air cooling, are also contemplated.

After leaving the deoxo reactor 817, the syngas flows to heat exchanger 820c to cool the gas. The reprocessed gas (e.g., syngas) then flows from heat exchanger 820f and 820c to a water removal unit 818, e.g., a water knockout drum, demister, dryer, membrane, cyclone, desiccant or similar, where water is removed from the syngas. In general, the syngas upon leaving unit 818 should have less than about 5% water by weight, less than about 2%, less than about 1% and less than about 0.1% water.

After leaving unit 818, the now dry syngas is in the synthesis stage 802. In stage 802 the now dry syngas flows to an assembly 830. Assembly 830 provides for the controlled addition of a hydrogen-rich gas from line 831 into the now dry syngas. In this manner the ratio of the syngas components can be adjusted and controlled to a predetermined ratio. The hydrogen is provided from hydrogen separation unit 839. The ratio-adjusted dry syngas leaves assembly 830 and flow to compressor 832. Compressor 832 compresses the syngas to an optimal pressure as taught and disclosed in this specification, for use the synthesis unit 833. Preferably, the synthesis unit 833 is optionally a two-stage unit with a first reactor unit 833a and a second reactor unit 833b. Synthesis unit 833 also has recuperative heat exchanger 820e.

The synthesis unit 833 converts the ratio-adjusted dry syngas into a value-added product, methanol. The methanol flows into to heat exchanger (i.e., cooler) 820d. The methanol flows to a collection unit 840. The collection unit 840 collects the condensed methanol and flows it through line 841 for sale, holding, or further processing.

Generally, the syngas is compressed to a pressure of about 15 to about 100 bar and preferably 30-50 bar, and about 25 to about 80 bar, at least about 10 bar, at least about 25 bar and at least about 50 bar, and greater and lower pressures. The temperature of the pressurized syngas is adjusted to a temperature of about 150° C. to about 350° C. and preferably 250° C., about 200° C. to about 300° C., about 250° C. to about 375° C., greater than 125° C., greater than 150° C., greater than 200° C., greater than 250° C., greater than 350° C., and less than 400° C., and higher and lower temperatures. The pressure and temperature-controlled syngas is then feed to reactors for transforming the syngas into a more useful, more easily transportable, and economically viable product such as methanol, ethanol, ammonia, dimethylether, F-T liquids, and other fuels or chemicals. In a preferred embodiment methanol is produced using the overall reaction of syngas to methanol via reactions for hydrogenation of CO, hydrogenation of $CO_2$, and reverse water-gas shift using actively cooled reactors, such as a heat-exchanged reactor or boiling water reactor, and a copper containing catalyst such as $Cu/ZnO/Al_2O_3$ or the like.

Generally, and in preferred embodiments, the characteristic length scale of the reactors used in this system are sufficiently small (e.g., micro-channel or mini-channels) that they can be shaped into unconventional shapes and topologies using new 3D printing techniques for metals and other high-temperature materials, thus allowing compact packaging and tight control over reaction conditions. Other strategies for intensification of the downstream synthesis reactions can also be considered, such as selectively removing the product from the reactor in-situ, or in a closely coupled fashion, to shift the equilibrium-limited reaction to higher conversion. This process intensification may minimize the need for large recycle streams or allow the reaction to proceed at milder conditions (e.g., lower pressure) thereby increasing process safety margins and providing other benefits.

In general, the ratio of $H_2/CO$ in the syngas produced by the engine can be tailored to the downstream conversion process. For example, for methanol synthesis or Fischer-Tropsch (F-T) synthesis the ideal $H_2/CO$ ratio is 2-3. For ammonia synthesis or for hydrogen production, the maximum possible $H_2/CO$ ratio is desirable and can be enhanced by, for example, steam addition to promote the water-gas shift reaction. For ammonia and hydrogen production, the CO is not required by the downstream synthesis. As such, CO and $CO_2$ byproducts can be collected, sequestered, stored or utilized for other purposes.

The collection unit 840 also has a line that flows gas separated from the methanol to a tee-connector 835, where it is sent to hydrogen separation unit 839, to a recycle loop or both. The recycle loop has compressor 834 and valve 838 to feed the methanol back into the synthesis unit 833. Hydrogen separation can be achieved by via membrane separation or pressure swing absorption (PSA) or the like in the hydrogen separation unit 839.

The remaining gas after hydrogen separation is sent through loop 890 and through heat exchanger 820*f* to turbo-expander 891, where the gas is then sent to exhaust. The turbo-expander generates power that offsets some of the compressor power requirements.

In an embodiment of the system of FIG. 8, the reformer 814 is a spark ignition (otto cycle) reciprocating engine. This system can be preferably operated as set forth in the T-S diagram of FIG. 13. The reference points (numbers—81, 82, 83, 84, 85, 86, 87, 88, 89 in FIG. 8) correspond to process conditions, i.e., state points, at those locations in the system of FIG. 8, and those process conditions are shown by corresponding reference points in FIG. 13. The line from state point 84*a'* to 84*b'* represents a reduction in compression ratio that occurs in response to a more reactive flare gas fuel. State point 85*b* relates to the syngas exiting the syngas reformer after the expansion of the turbocharger. The expansion from 85 to 85*b* occurs within the turbocharger. The starting specific entropy for this process is at points 81, 82 (6.9 kJ/kg ° C.) and the final specific entropy point for this process is 89 (6.95 kJ/kg ° C.). Thus, the difference between the start and final specific entropy is 0.05 kJ/kg ° C.

In an embodiment of the system of FIG. 8, the reformer 814 is a compression ignition (diesel cycle) reciprocating engine. This system can be preferably operated as set forth in the T-S diagram of FIG. 14. The reference points (numbers—81, 82, 83, 84, 85, 86, 87, 88, 89 in FIG. 8) correspond to process conditions, i.e., state points, at those locations in the system of FIG. 8, and those process conditions are shown by corresponding reference points in FIG. 14. The line from state point 84*a'* to 84*b'* represents a reduction in compression ratio that occurs in response to a more reactive flare gas fuel. State point 85*b* relates to the syngas exiting the syngas reformer after the expansion of the turbocharger. The expansion from 85 to 85*b* occurs within the turbocharger. The starting specific entropy for this process is at points 81, 82 (6.9 kJ/kg ° C.) and the final specific entropy point for this process is 89 (6.95 kJ/kg ° C.). Thus, the difference between the start and final specific entropy is 0.05 kJ/kg ° C.

Preferably, the spark ignition (otto cycle) reciprocating engine and compression ignition (diesel cycle) reciprocating engine embodiment of the system and process of FIG. 8, have one or more of the devices and processes to reduce compressor. Thus, the systems and processes of FIG. 8 can have or use one or more of: (a) reducing the amount of nitrogen; (b) increasing back-pressure of the engine from standard 1 or 2 bar, to up to 5 bar; (c) use a turbo-expander to recover much of the compression work, thus lowering the cost, among other efficiencies, to operate a plant; and (d) utilizing an intensified synthesis loop to achieve acceptable methanol synthesis at lower overall pressure. These devices and processes to reduce compressor work can be used in conjunction with the systems and processes of FIG. 8, as a part of (e.g., modular, integral, and combinations thereof)

the systems and processes of FIG. 8, and combinations and variations of this manner of association.

EXAMPLES

The following examples are provided to illustrate various embodiments of the present waste fuel, e.g., flare gas conversion systems, devices and processes. These examples are for illustrative purposes, may be prophetic, and should not be viewed as, and do not otherwise limit the scope of the present inventions.

Example 1

Turning to FIG. 10 there is shown an embodiment of a turbo-expander heat exchanger system for reducing the compressor work required for reformer-based hydrocarbon processing systems, such as gas-to-liquid systems. The system 1000 has three stages, 1100, 1200, 1300. Each stage has compressor and turbine assembly and a heat exchanger. Stage 1100 has compressor 1101 that is driven by turbine 1102 and a heat exchanger 1103. Stage 1200 has compressor 1201 that is driven by turbine 1202 and a heat exchanger 1203. Stage 1300 has compressor 1301 that is driven by turbine 1302 and a heat exchanger 1303. In operation a product 600, which typically can be tail gas that is separated out by the gas-to-liquid system, is feed into stage 1300. The product 600 can have a pressure above 50 bar and a temperature less than 250 C. The product 600 flows through stages 1300, 1200 and 1100 as shown in the figure. Reactants 500, which can be the materials provided by the output of the reformer, e.g., syngas, is feed into stage 1100, and flows through stage 1200 and 1300 as shown in the figure exiting near 250° C. and 50 bar. Graph 1000*b* shows the pressure, and pressure changes, of the product 600*b* and reactants 500*b* as they move through the stages 1100*a*, 1200*a*, 1300*a*. Graph 1000*c* shows the temperature, and temperature changes, of the product 600*c* and reactants 500*c* as they move through the stages 1100*a*, 1200*a*, 1300*a*. The 1 and 5 on the axis of graph 1000*b* indicate pressure in units of bar.

It is understood that while the embodiment of FIG. 10 has three stages, a single stage, two stages, four stages, five stages or more are contemplated. The system 1000 can be an integral part of a gas-to-liquid system, such as the systems of FIG. 3, 4, 6, 7, or 8. It can be a separate module(s), e.g., skid mounted, that is operationally connected (e.g., pipes, valves, control systems) to the gas-to-liquid system.

Example 2

In an embodiment the system 100 of FIG. 3 has a turbo-expander-compressor-heat exchanger system, such as shown for example in FIG. 10 as the compressor 132. In this embodiment, the product 600 in FIG. 10 is the tail gas from hydrogen separation unit 139. And the reactants 500 in FIG. 10 would be the ratio adjusted dry reprocessed gas (e.g., syngas) leaving assembly 830.

Example 3

In an embodiment the system 100 of FIG. 3 the high-pressure liquid and gaseous product streams are expanded through valves (or backpressure regulators) in a Joule-Thompson (substantially isenthalphic) expansion process. In this configuration, auxiliary power is required for compression as there is not sufficient power for self-sufficiency.

Example 4

In an embodiment the system 1600 of FIG. 4 has a turbo-expander-compressor-heat exchanger system, such as shown for example in FIG. 10 as the compressor 1632. In this embodiment, the product 600 in FIG. 10 is the tail gas from hydrogen separation unit 1639. And the reactants 500 in FIG. 10 would be the ratio adjusted dry reprocessed gas (e.g., syngas) feeding compressor 1632.

Example 5

In an embodiment the system 800 of FIG. 8 has a turbo-expander-compressor-heat exchanger system, such as shown for example in FIG. 10 as the compressor 832. In this embodiment, the product 600 in FIG. 10 is the tail gas from hydrogen separation unit 839. And the reactants 500 in FIG. 10 would be the ratio adjusted dry reprocessed gas (e.g., syngas) leaving assembly 830. The turbo-expander 891 may not be used in this embodiment, or still may be used for excess tail gas that is not utilized for the operation of the turbo-expander-compressor-heat-exchanger of FIG. 10.

Example 6

In an embodiment of a modular system and method of the type shown in FIG. 3, 4, 6, 7, 8 or 15, the system and method utilize a nominally air-breathing engine that is operated under rich conditions and having means to produce pressurized syngas. The syngas can have pressure exiting the engine reformer greater than 1 bar, greater than 2 bar, greater than 3 bar, greater than 4 bar, greater than 5 bar, from about 2 bar to about 5 bar, from about 3 bar to about 5 bar. In this system for example where the syngas exiting the water knockout and entering the compressor is at temperature of about 50° C., from 40° C. to 60° C., or higher or lower.

Example 7

In an embodiment of a modular system and method of the type shown in FIG. 3, 4, 6, 7, 8 or 15, the system and method utilize a nominally air-breathing engine that is operated under rich conditions and having means to produce pressurized syngas. The system further has a means to reduce the amount of nitrogen, such as an oxygen enrichment unit, or an air separation unit, or a nitrogen rejection unit from the syngas. In this system for example where the nitrogen is reduced by 10% or 20% or more.

Example 8

In an embodiment of a modular system and method of the type shown in FIG. 3, 4, 6, 7, 8 or 15, the system and method utilize a nominally air-breathing engine that is operated under rich conditions and having means to produce pressurized syngas. The system further has a turbo-expander or expansion turbine, such as a turbine-driven shaft using excess high pressure gas that is expanded to produce work. In this system for example the turbine inlet is at about 50 bar and the turbine exit is at about 3 bar.

Example 9

In an embodiment of a modular system and method of the type shown in FIG. 3, 4, 6, 7, 8 or 15, the system and method utilize a nominally air-breathing engine that is operated under rich conditions and having means to produce pressurized syngas. The system further has an intensified synthesis loop for methanol synthesis at lower pressures, such as via reactive separation of the products or by-products. In this system for example where the single-pass methanol synthesis conversion increases by 5% or 10% or more or less.

Example 10

In an embodiment the exhaust backpressure of the engine reformer is increased to reduce the downstream syngas compression requirements. It is anticipated that the exhaust pressure could reasonably be increased from typical values near atmospheric pressure (ca. 1 bar) up to 5 bar or higher. Considering that the downstream synthesis pressure is set nominally to 50 bar, increasing the engine reformer exhaust backpressure reduces the overall pressure ratio for syngas compression and reduces the compressor work (kJ/kg) or power (kW). Because the engine reformer is self-sustaining, increasing the exhaust backpressure does not directly impact upstream compression work. Increasing the backpressure does however impact the volumetric efficiency of the engine and the net brake power of the engine. These trades suggest an optimal backpressure at some intermediate value. The backpressure is determined by the resistance to flow of the downstream processes. Various engine modifications (e.g., turbocharging the engine reformer inlet air, modification of the engine valve timing to reduce or eliminate valve overlap) are anticipated to maintain acceptable engine performance with elevated exhaust backpressure.

Example 11

In an embodiment reactive separation is used to selectively remove the products (or byproducts) of the reaction to shift the equilibrium towards the products according to Le Chatelier's principle. The products (e.g., methanol) or byproducts (e.g., water) are either removed from the synthesis reactor in situ or in a close-coupled fashion. Close-coupled means in a loop without an expensive and energy intensive downstream separation. The separation can be accomplished through adsorption, absorption, membrane separation, distillation, or the like. The reactive separation enables good single-pass conversion and reduces or eliminates the need for an energy-intensive and capital-intensive separation and recycle loop. More importantly in the context of this solution, reactive separation provides an alternative to increasing the reactor pressure and as a result reduces the compression work required for the process. The adsorption separation can use a variety of adsorbents (e.g., silica-alumina) that are selective to methanol or water and various adsorption equipment (e.g., packed beds, moving beds, simulated moving beds). The absorption separation can use a variety of absorbents (e.g., tetraethylene glycol dimethyl ether, commonly TGDE or tetraglyme, or squalane) in various absorption equipment (e.g., trickle beds, bubble columns). Membrane separations can use a variety of polymeric materials (e.g., sulfonated tetrafluoroethylene based fluoropolymer-copolymer such as Nafion®) or ceramic materials (e.g., zeolites) to selectively remove methanol or water in a variety of membrane module configurations (e.g., hollow fiber bundles, spiral wound, plate frame). Optionally the membrane separation can use a sweep stream on the permeate side that is a gas (e.g., air) or liquid (e.g., TGDE). Reactive distillation (RD) can also be used selectively remove methanol from the reactants based on differences in volatility. Optionally the RD can use various improved (e.g., dividing wall column distillation) or hybrid (e.g., extractive distillation with TGDE or the like) distillation approaches.

Example 12

In an embodiment a turbo-expander is used to generate shaft work to partially offset the compression work requirements. The turbo-expander can export shaft work directly to another rotating machine (e.g., compressor) or generate electrical power or pneumatic/hydraulic pressure that can be used elsewhere in the process (e.g., to drive compressors or pumps). As part of an energy recovery system, a heat exchanger can beneficially recover heat from other parts of the process (e.g., the hot syngas stream) to increase the enthalpy of the stream going to the turbo-expander and increase the amount of work produced by the turbo-expander. This heat recovery or recuperation also is helpful to maintain reasonable turbo-expander exit temperatures (e.g., to minimize condensation or freezing in the exit stream) and to reduce the cooling duty elsewhere in the process (e.g., the syngas stream) and thereby reduce the need for air-cooled heat exchangers. The recuperative heat exchanger can use either direct heat exchange or indirect heat exchange through some other heat transfer medium (e.g., steam, or heat transfer fluid). If an indirect heat transfer loop is used, optionally the loop can incorporate thermal energy storage (e.g., as sensible heat in tank of the heat transfer medium or latent heat in a phase change material). In a preferred embodiment, an integrated turbo-expander is envisioned with inter-stage heat exchange as part of a multi-stage compressor with the turbine directly driving the compressor in each stage. The coupled turbine-compressor can be an industrial compressor-expander ("compander") or automotive turbocharger.

Example 13

A small-scale plant, targeting 3,000,000 scfd (standard cubic feet per day) of inlet gas. The size of such a plant could vary from 50,000 scfd to 15,000,000 scfd. The plant is incorporated into one or more modular, interconnected skids or containers that are built at a central fabricator shop location and then installed at a field location. The system comprises a small number of modules that when connected at site form an integrated system. The modular nature of the assembly enables application to remote locations under a range of inlet gas feed volumes, with a minimum of field labor. The modular nature further improves flexibility to deploy or redeploy these assets, reduces initial capital outlay and project financial risks, allows matching of the process throughput to the flare gas supply, and reduces time-to-market by allowing module fabrication and site preparation to occur in parallel. The plant has one or more of (a) reducing the amount of nitrogen; (b) increasing back-pressure of the engine from standard 1 or 2 bar, to up to 5 bar; (c) use of a turbo-expander to recover much of the compression work, thus lowering the cost, among other efficiencies, to operate a plant; and (d) utilizing an intensified synthesis loop to achieve acceptable methanol synthesis at lower overall pressure.

Example 14

Figure 15:
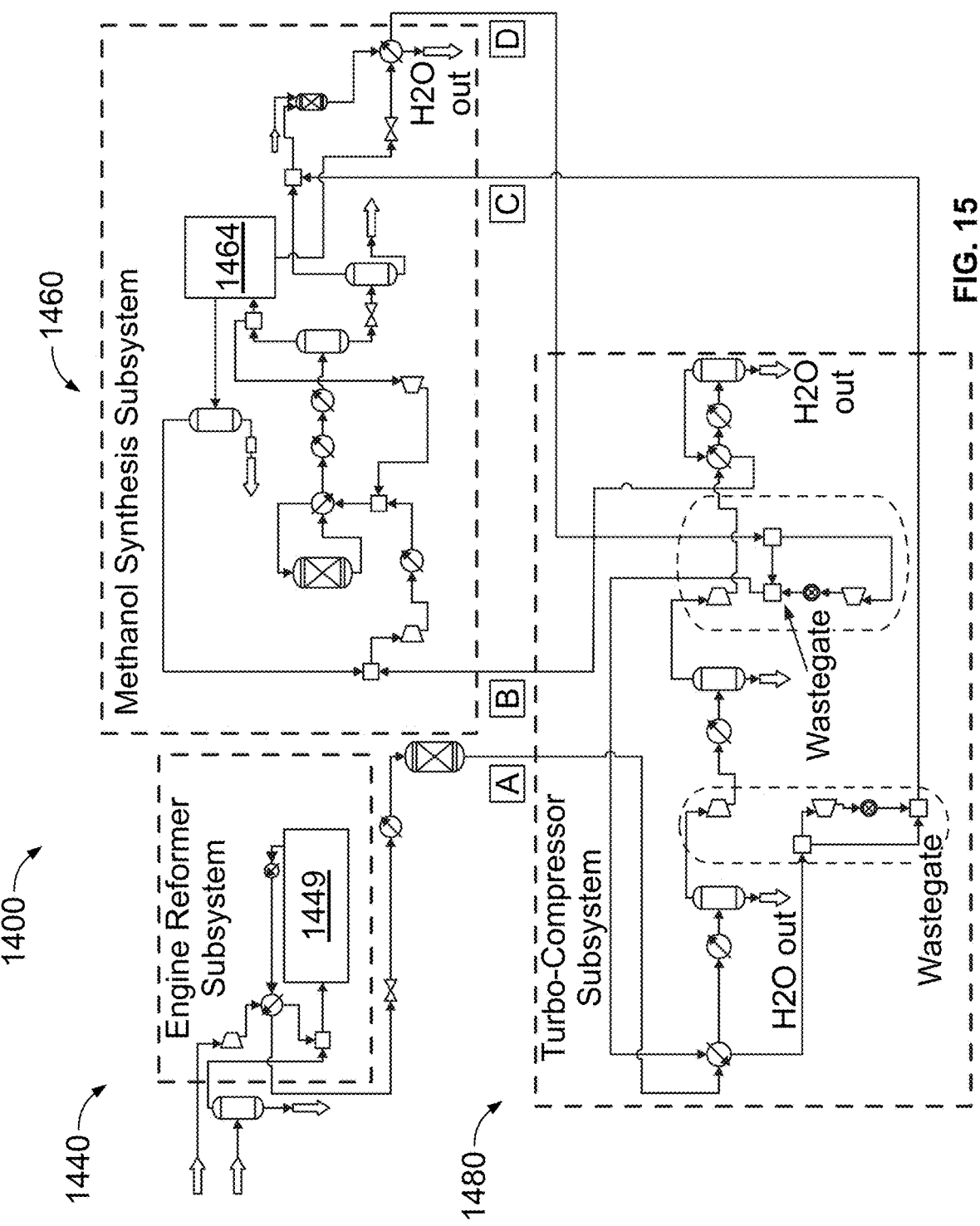

In an embodiment of a system that includes components described in Example 10 and 12, a complete system, balanced in terms of mass flows and energy, is shown in FIG. 15.

Figure 15A:
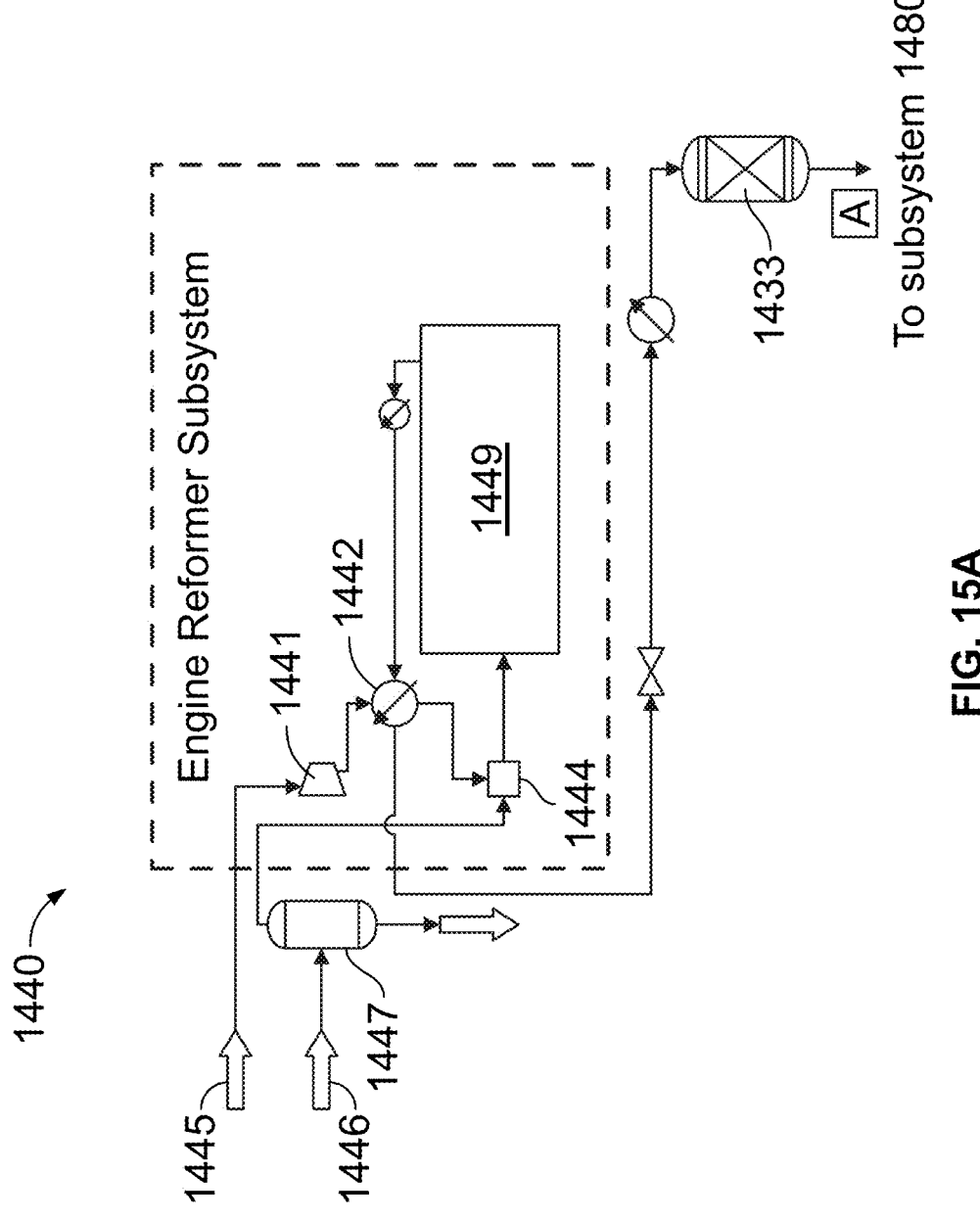
Figure 15B:
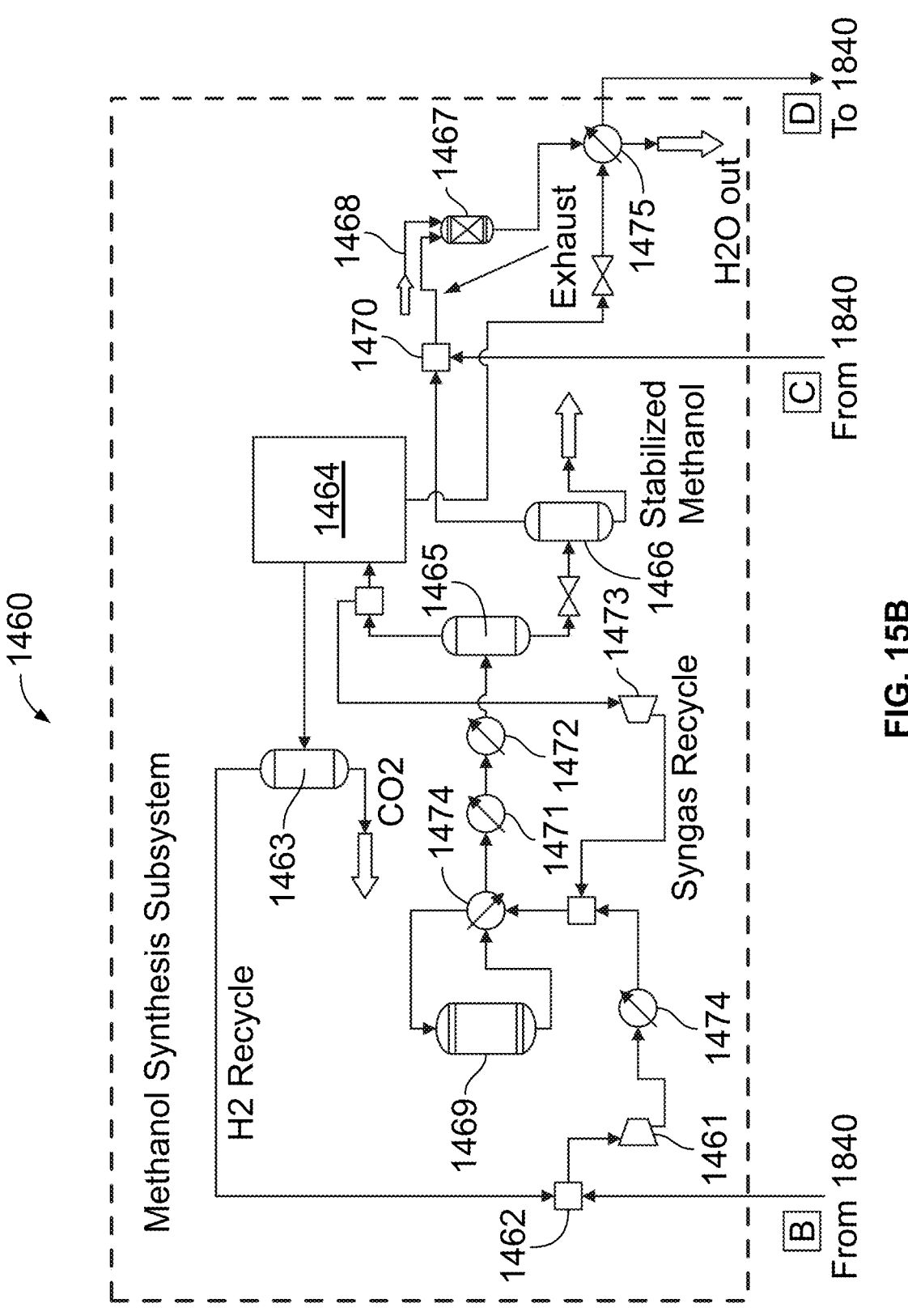
Figure 15C:
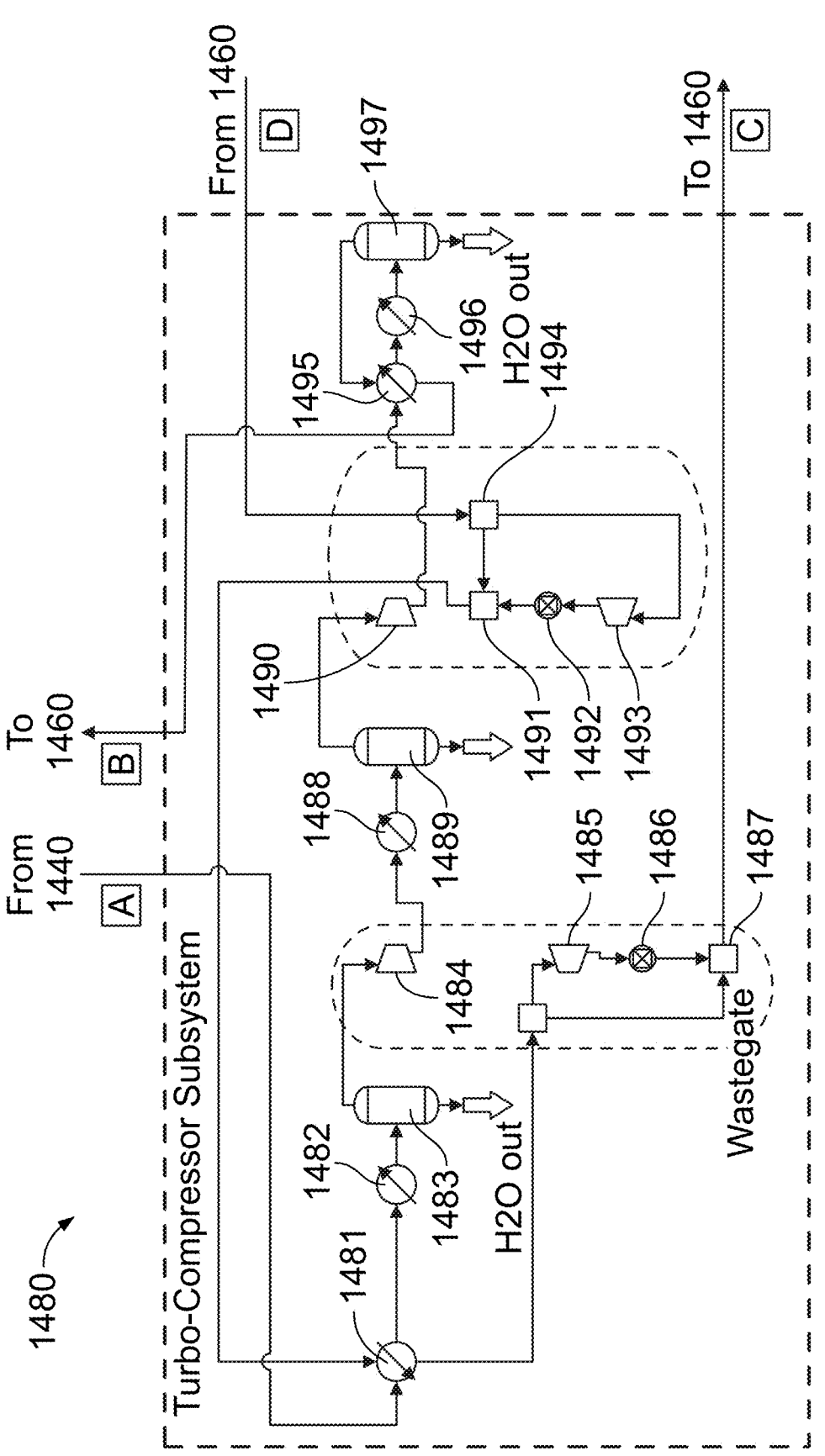

Turning to FIG. 15, and FIGS. 15A to 15C, there is shown a schematic of a system and process system utilizing the embodiments of Examples 10 and 13 in a gas-to-liquid system 1400. The system and process 1400 has a reformer subsystem 1440, a methanol subsystem 1460 and a turbo-expander (e.g., turbo compressor) subsystem 1480. An enlarged view of the reformer subsystem 1440, (and other components) are shown in FIG. 15A. An enlarged view of the methanol subsystem 1460 is shown in FIG. 15B. An enlarged view of the turbo-expander subsystem 1480 is shown in FIG. 15C. (Lines or pipes, A, B, C, D provide fluid flow and fluid communication between the three subsystems.)

Turning to FIG. 15A, Reformer subsystem 1440, has an air intake 1445 for receiving a flow of air and a hydrocarbon gas intake 1446 (e.g., flare gas intake) for receiving a flow of hydrocarbon gas (e.g., flare gas). The reformer subsection has a supercharger 1441, an air preheater 1442, an air breathing reformer 1449, a mixer 1444 and a desulfur unit 1447. Additionally, there is shown a DeOxo unit 1433 on the line from the reformer subsystem 1440 to the turbo-expander subsystem 1460. Arrows show the direction of flow in the system and process.

Turning to FIG. 15B, methanol syntheses subsystem 1460, has a compressor 1461, mixer 1462, $CO_2$ membrane unit 1463, and hydrogen membrane unit 1464. The subsystem 1460 has reactor unit 1469, heat exchanger 1474. The subsystem 1460 also has heat exchangers 1471, 1472 and methanol condenser 1465, and methanol degasser 1466. The system has tail gas oxidizer unit 1467 that air in feed 1468, and an associated heat exchanger 1475. The system 1460 has compressor 1473, heat exchanger 1474, and mixer 1470. The system has arrows show the direction of flow in the system and process.

Turning to FIG. 15C, the turbo-expander subsystem 1480 has a heat exchanger 1481, a heat exchanger 1481 and a knock-out drum 1483. The subsystem 1480 has a compressor 1484 and a turbine 1485. The turbine (turbo-expander) 1485 also has associated with it a balancing valve 1486 and a mixer 1487. The subsystem 1480 has a heat exchanger 1488, and a water knock-out drum 1439. The subsystem 1480 has a compressor 1490 and turbine (turbo-extractor) 1493, which has a balancing valve 1491 and a heat exchanger 1492 associated with it. The subsystem 1480 also has a splitter 1494, a heat exchanger 1495, a heat exchanger 1496 and a water knock-out drum 1497. The system has arrows show the direction of flow in the system and process.

This system utilizes high-pressure stream from the chemical process and thermal energy (heat) available in the process to create shaft work via turbo-expanders. The shaft work drives the initial compression system for the incoming process stream. Additional turbine work is generated by the addition of reheat between stages on the turbine side. Compression work is reduced by intercooling between stages of compression. Individual bypass (wastegate) control valves are used for turbo-compressor control. The outlet pressure of the initial compression system is matched to the outlet pressure of the retentate (tail gas) from the hydrogen separation unit, allowing the streams to be combined into a single compression device to raise the pressure to pressure needed for the methanol process. For a system that processes nominally 58 kg/h of inlet hydrocarbon gas, this turbo-compressor system reduces the external shaft power, such as that provided by an electric motor, from 98 $kW_e$ to 60 $kW_e$. The condensing temperature of the process streams is raised from 30° C. to 60° C., resulting in reduction of chiller load from 258 $kW_{th}$ to 20 $kW_{th}$.

It is noted that there is no requirement to provide or address the theory underlying the novel and groundbreaking production rates, performance or other beneficial features and properties that are the subject of, or associated with, embodiments of the present inventions. Nevertheless, various theories are provided in this specification to further advance the art in this important area, and in particular in the important area of hydrocarbon exploration, production and downstream conversion. These theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the conduct, activities, resource production, chemistries, and function-features of embodiments of the methods, articles, materials, devices and system of the present inventions; and such later developed theories shall not limit the scope of protection afforded the present inventions.

The various embodiments of devices, systems, activities, methods and operations set forth in this specification may be used with, in or by, various processes, industries and operations, in addition to those embodiments of the figures and disclosed in this specification. The various embodiments of devices, systems, methods, activities, and operations set forth in this specification may be used with other processes industries and operations that may be developed in the future; with existing processes industries and operations, which may be modified, in-part, based on the teachings of this specification; and with other types of gas recovery and valorization systems and methods. Further, the various embodiments of devices, systems, activities, methods and operations set forth in this specification may be used with each other in different and various combinations. Thus, for example, the configurations provided in the various embodiments of this specification may be used with each other. For example, the components of an embodiment having A, A' and B and the components of an embodiment having A", C and D can be used alone or with each other in various combination, e.g., A, C, D, and A, A", C, D, and A', B, and D, etc., in accordance with the teaching of this specification. Thus, the scope of protection afforded the present inventions should not be limited to a particular embodiment, configuration or arrangement that is set forth in a particular embodiment, example, or in an embodiment in a particular figure.

The invention may be embodied in other forms than those specifically disclosed herein without departing from its spirit or essential characteristics. The described embodiments are to be considered in all respects only as illustrative and not restrictive.

What is claimed:

1. A method of converting a gas to an end product, the method comprises:
   a. receiving a flow of a hydrocarbon-based fuel source, where the composition is primarily gaseous hydrocarbons and inert gases from a source;
   b. partially oxidizing the fuel source in an air-breathing reciprocating engine to produce a syngas mixture with a $H_2/CO$ ratio suitable for synthesis of liquids; and,
   c. performing a step for reducing compressor work.

2. The method of claim 1, wherein the step for reducing compressor work comprises reducing an amount of nitrogen.

3. The method of claim 1, wherein the step for reducing compressor work comprises increasing a back-pressure of the air-breathing reciprocating engine.

4. The method of claim 3, wherein the back-pressure is increased up to 5 bar.

5. The method of claim 3, wherein the back-pressure is greater than 2 bar.

6. The method of claim 1, wherein the step for reducing compressor work comprises using a turbo-expander heat exchanger system.

7. The method of claim 1, wherein the step for reducing compressor work comprises a reactive separation synthesis.

8. The method of claim 1, wherein the air-breathing reciprocating engine is a rich-burn engine.

9. The method of claim 1, wherein the air-breathing reciprocating engine is a variable compression ratio engine.

10. The method of claim 1, wherein the air-breathing reciprocating engine is a compression ignition engine.

11. The method of claim 1, wherein the air-breathing reciprocating engine is a spark ignition engine.

12. The method of claim 1, wherein the fuel source is a flare gas.

13. The method of claim 1, wherein the engine is operated under an ER of at least 1.5.

14. The method of claim 1, wherein the engine is operated under an ER of at least about 2.

15. The method of claim 1, wherein the engine is operated under an ER of at least about 2.5.

16. The method of claim 1, wherein the engine is operated under an ER of at least about 3.

17. The method of claim 1, wherein the engine is operated under an ER of from about at least about 2.5.

18. The method of claim 1, wherein a compression ratio is controlled between a ratio of 8:1 to 14:1.

19. The method of claim 1, wherein the end product comprises methanol.

20. The method of claim 1, wherein the end product comprises a material selected for the group consisting of ethanol, ammonia, dimethyl-ether, and F-T liquids.

21. A system for converting a gas to an end product, the system comprises:
   a. an inflow port for receiving a flow of a hydrocarbon-based fuel source, where the composition is primarily gaseous hydrocarbons and inert gases from a source;
   b. the inflow port in fluid communication with an air-breathing reciprocating engine, whereby the engine is configured to partially oxidizing the fuel source to produce a syngas mixture with a $H_2/CO$ ratio suitable for synthesis of liquids; and,
   c. a means for reducing compressor work.

22. The system of claim 21, wherein the means for reducing compressor work comprises a means to reduce the amount of nitrogen.

23. The system of claim 22, wherein the means to reduce the amount of nitrogen comprises an oxygen enrichment unit.

24. The system of claim 22, wherein the means to reduce the amount of nitrogen comprises a nitrogen rejection unit.

25. The system of claim 21, wherein the means for reducing compressor work comprises an increased back-pressure of the air-breathing reciprocating engine.

26. The system of claim 25, wherein the increased back-pressure is up to 5 bar.

27. The system of claim of claim 25, wherein the increased back-pressure is greater than 2 bar.

28. The system of claim 21, wherein the means for reducing compressor work comprises using a turbo-expander-compressor-heat exchanger system.

29. The system of claim 28, wherein the turbo-expander-compressor-heat exchanger system comprises 3 stages.

30. The system of claim 28, wherein the turbo-expander-compressor-heat exchanger system comprises a compressor turbine assembly.

31. The system of claim 28, wherein the turbo-expander-compressor-heat exchanger system comprises 2 stages and each stage comprises a compressor, a turbine and a heat exchanger.

32. The system of claim 31, wherein the turbo-expander-compressor-heat exchanger system comprises 3 stages and each stage comprises a compressor, a turbine and a heat exchanger.

33. The system of claim 21, wherein the means for reducing compressor work comprises a reactive separation synthesis loop.

34. The system of claim 21, wherein the air-breathing reciprocating engine is a rich-burn engine.

35. The system of claim 21, wherein the air-breathing reciprocating engine is a variable compression ratio engine.

36. The system of claim 21, wherein the air-breathing reciprocating engine is a compression ignition engine.

37. The system of claim 21, wherein the air-breathing reciprocating engine is a spark ignition engine.

38. The system of any claim 21, wherein the fuel source is a flare gas.

39. The system of claim 21, wherein the engine is a compression ignition engine including a diesel cycle engine, or homogeneous charge compression ignition engine.

40. The system of claim 21, wherein the engine is a spark ignition engine including an otto cycle.

41. The system of claim 21, wherein the engine is an opposed-piston free-piston linear internal combustion engine.

42. The system of claim 21, wherein the engine is a crankshaft-driven opposed-piston internal combustion engine with a crankshaft phaser to rotate the phasing of one piston relative to the other thereby modifying overall compression ratio.

43. The system of claim 21, wherein the engine is a conventional spark-ignited reciprocating engine that achieves variable effective compression ratio utilizing camshaft phasers to rotate the intake and exhaust camshafts to affect valve opening and closing.

44. The system of claim 21, wherein the engine is a conventional spark-ignited reciprocating engine that achieves variable effective compression ratio utilizing a variable lift and/or duration valvetrain to affect valve opening and closing.

45. The system of claim 21, wherein the engine comprises a multi-link system in place of a traditional connecting rod to rotate the crankshaft, and an actuator motor changes the multi-link system endpoint.

46. The system of claim 21, wherein the engine is a 2-stroke engine.

47. The system of claim 21, wherein the engine is a 4-stroke engine.

48. The system of claim 21, wherein the engine speed is varied together with engine compression ratio to achieve desired combustion burn and desired exhaust gas composition.

49. The system of claim 21, wherein the inlet manifold air temperature is varied together with engine compression ratio to achieve desired combustion burn and desired exhaust gas composition.

50. The system of claim 21, wherein the inlet manifold air pressure, defined as a boost level, is varied together with engine compression ratio to achieve desired combustion burn and desired exhaust gas composition.

51. The system of claim 21, wherein steam or hydrogen is added to the incoming air or fuel and the amount of addition is varied together with engine compression ratio to achieve desired combustion burn and desired exhaust gas composition.

52. A system for converting a flare gas into methanol with reducing compressor work, the system comprising:

a. a first line for receiving a flow of air, and a second line for receiving a flow of a flare gas;

b. the first and second lines in fluid communication with an air breathing engine reformer assembly;

c. a turbo-expander assembly in fluid communication with a third line;

d. the engine reformer assembly in fluid communication with the third line;

e. wherein the third line connects the engine reform assembly and the turbo-expander assembly, whereby an intermediate product from the engine reformer can flow to the turbo expander assembly;

f. the turbo-expander assembly in fluid communications with a fourth line, a fifth line and a sixth line;

g. a methanol synthesis assembly in fluid communication with the fourth line, the fifth line and the sixth line;

h. wherein the fourth line connects the turbo-expander to the methanol synthesis assembly and is configured to provide a first flow from the turbo-expander to the methanol synthesis assembly;

i. wherein the fifth line connects the turbo-expander to the methanol synthesis assembly and is configured to provide a second flow from the turbo-expander assembly to the methanol synthesis assembly;

j. wherein the sixth line connects the turbo-expander to the methanol synthesis assembly and is configured to provide a third flow from the methanol synthesis assembly to the turbo-expander assembly.

53. The system of claim 52, wherein the intermediate product is a synthesis gas.

54. The system of claim 52, wherein the first flow from the turbo-expander to the methanol synthesis assembly is a synthesis gas.

* * * * *